(12) United States Patent
Hou et al.

(10) Patent No.: US 11,432,368 B2
(45) Date of Patent: Aug. 30, 2022

(54) NETWORK ACCESS METHOD FOR HYBRID NETWORKING, PROXY COORDINATION DEVICE, AND STATION DEVICE

(71) Applicant: Huawei Technologies Co., Ltd., Shenzhen (CN)

(72) Inventors: Jianqiang Hou, Nanjing (CN); Yuefeng Wu, Nanjing (CN)

(73) Assignee: HUAWEI TECHNOLOGIES CO., LTD., Shenzehn (CN)

( * ) Notice: Subject to any disclaimer, the term of this patent is extended or adjusted under 35 U.S.C. 154(b) by 88 days.

(21) Appl. No.: 17/028,399

(22) Filed: Sep. 22, 2020

(65) Prior Publication Data

US 2021/0007180 A1    Jan. 7, 2021

Related U.S. Application Data

(63) Continuation of application No. PCT/CN2019/078752, filed on Mar. 19, 2019.

(30) Foreign Application Priority Data

Mar. 23, 2018    (CN) .......................... 201810245583.2

(51) Int. Cl.
*H04W 84/18* (2009.01)
*H04B 3/54* (2006.01)
(Continued)

(52) U.S. Cl.
CPC ............. *H04W 84/18* (2013.01); *H04B 3/54* (2013.01); *H04L 12/2879* (2013.01); *H04W 40/12* (2013.01)

(58) Field of Classification Search
CPC ....... H04W 84/18; H04W 40/12; H04W 4/70; H04W 24/08; H04B 3/54; H04B 3/46;
(Continued)

(56) References Cited

U.S. PATENT DOCUMENTS

2006/0126617 A1    6/2006    Cregg et al.
2007/0189182 A1    8/2007    Berkman et al.
(Continued)

FOREIGN PATENT DOCUMENTS

CN    101076967 A    11/2007
CN    102422661 A    4/2012
(Continued)

OTHER PUBLICATIONS

XP032636758, Gaddour, O., et al., "Co-RPL: RPL routing for mobile low power wireless sensor networks using Corona mechanism," Proceedings of the 9th IEEE International Symposium on Industrial Embedded Systems (SIES 2014), 10 pages.
(Continued)

*Primary Examiner* — Steven H Nguyen
(74) *Attorney, Agent, or Firm* — Conley Rose, P.C.

(57) ABSTRACT

A network access method includes calculating, by a proxy coordination device, a network access parameter based on a link quality parameter of the proxy coordination device in a power line communication (PLC) network, where the network access parameter includes link overheads, and the link overheads are used to indicate overheads for performing network access by a station device through the proxy coordination device based on radio frequency (RF) communication, and sending, by the proxy coordination device, a destination oriented directed acyclic graph (DODAG) information object (DIO) packet, where the DIO packet includes the link overheads.

20 Claims, 8 Drawing Sheets

(51) Int. Cl.
*H04L 12/28* (2006.01)
*H04W 40/12* (2009.01)
(58) Field of Classification Search
CPC ..... H04B 3/544; H04L 12/2879; H04L 67/28; H04L 12/28; H04L 45/123; H04L 12/2869; H04L 43/08; H04L 67/12; Y02D 30/70
See application file for complete search history.

(56) References Cited

U.S. PATENT DOCUMENTS

| | | | |
|---|---|---|---|
| 2012/0083281 A1 | 4/2012 | Watanabe et al. | |
| 2012/0155463 A1 | 6/2012 | Vasseur et al. | |
| 2013/0028104 A1* | 1/2013 | Hui | H04W 40/125 370/252 |
| 2013/0188673 A1 | 7/2013 | Sun et al. | |
| 2014/0036702 A1* | 2/2014 | Van Wyk | H04L 43/0823 370/252 |
| 2014/0056149 A1* | 2/2014 | Mani | H04L 47/10 370/235.1 |
| 2015/0043384 A1 | 2/2015 | Hui et al. | |
| 2015/0043661 A1* | 2/2015 | Okada | H04L 45/122 375/257 |
| 2015/0180772 A1 | 6/2015 | Hui et al. | |

FOREIGN PATENT DOCUMENTS

| | | |
|---|---|---|
| CN | 103262467 A | 8/2013 |
| CN | 103718534 A | 4/2014 |
| CN | 107483080 A | 12/2017 |
| EP | 2699040 A1 | 2/2014 |

OTHER PUBLICATIONS

Popa, D., "Mixing RF and PLC technology for high-performance multi-service smart metering, smart grid and IoT platforms," WSPLC—Sep. 2015, 27 pages.

* cited by examiner

NETWORK ACCESS METHOD FOR HYBRID NETWORKING, PROXY COORDINATION DEVICE, AND STATION DEVICE

CROSS-REFERENCE TO RELATED APPLICATIONS

This application is a continuation of International Patent Application No. PCT/CN2019/078752, filed on Mar. 19, 2019, which claims priority to Chinese Patent Application No. 201810245583.2, filed on Mar. 23, 2018, both of which are hereby incorporated by reference in their entireties.

TECHNICAL FIELD

This application relates to the communications field, and specifically, to a network access method for hybrid networking, a proxy coordination device, and a station device.

BACKGROUND

A power line communication (PLC) technology is a power system communications technology in which an electric transmission line is used as a transmission medium of a carrier signal. A PLC technology in China is based on the Institute of Electrical and Electronics Engineers (IEEE) 1901.1 standard, is also referred to as a PLC-internet of things (PLC-IoT) technology, and is a communications technology using layer 2 forwarding.

A radio frequency (RF) communications technology is currently one of most influential internet of things technologies, and is widely applied in the fields of smart grids, intelligent home networks, and the like. The industry usually constructs an RF network using a technical framework specified in the Internet Protocol version 6 (IPv6), IPv6 over low-power wireless personal area networks (6LoWPAN), and low-rate wireless personal area networks (LR-WPANs). An RF network is a communications technology using layer 3 forwarding.

A PLC network has relatively high bandwidth and is not constrained by a physical obstacle, and can implement communication in scenarios such as through-wall, underground, and tunnels. However, there is still a technical obstacle in crossing a transformer through the PLC network. The RF network has relatively high flexibility of device deployment and is not constrained by a transformer in a smart meter scenario. However, strength of a radio signal is easily affected by a physical obstacle. Especially in underground and tunnels, communication quality is significantly reduced. The combination of the PLC network and the RF network just can make up for disadvantages of each other and highlight advantages of each other. Both a physical layer and a link layer of the PLC network are quite different from those of the RF network. In the two networks, there are different packet formats, device network access processes, and routing manners. Therefore, it is quite difficult to implement hybrid networking of the PLC network and the RF network.

SUMMARY

This application provides a network access method for hybrid networking, a proxy coordination device, and a station device such that a station device can select a better network access path based on link overheads, helping to improve operation efficiency of a hybrid network.

According to a first aspect, a network access method for hybrid networking is provided, where the network access method includes calculating, by a proxy coordination device, a network access parameter based on a link quality parameter of the proxy coordination device in a PLC network, where the network access parameter includes link overheads, and the link overheads are used to indicate overheads for performing network access by a station device through the proxy coordination device based on RF communication, and sending, by the proxy coordination device, a destination oriented directed acyclic graph (DODAG) information object (DIO) packet, where the DIO packet includes the link overheads.

In the network access method for hybrid networking in the first aspect, the proxy coordination device calculates, based on the link quality parameter of the proxy coordination device in the PLC network, the link overheads used to indicate overheads for performing network access by the station device through the proxy coordination device based on RF communication, and sends the link overheads to the station device through the DIO packet such that the station device can select a better network access path based on the link overheads, helping to improve operation efficiency of a hybrid network.

In a possible implementation of the first aspect, the calculating, by a proxy coordination device, a network access parameter based on a link quality parameter of the proxy coordination device in a PLC network may include calculating, by the proxy coordination device, a wireless quality parameter based on the link quality parameter, where the wireless quality parameter includes any one or more of the following an expected transmission count (ETX), an link quality level (LQL), and a hop count, where the ETX is calculated based on a proxy communication rate, the LQL is calculated based on proxy channel quality, and the hop count is calculated based on a level, and calculating, by the proxy coordination device, the link overheads based on the wireless quality parameter. In this possible implementation, the wireless quality parameter of an RF network is first calculated based on the link quality parameter of the proxy coordination device in the PLC network, and then the link overheads are calculated based on the wireless quality parameter such that the calculated link overheads are more accurate, helping the station device to find an optimal path when the station device selects a network access path based on link overheads.

In a possible implementation of the first aspect, the network access parameter further includes a restriction parameter, where the restriction parameter may include any one or more of the following an ETX, an LQL, and a hop count, where the ETX is calculated based on a proxy communication rate, the LQL is calculated based on proxy channel quality, and the hop count is calculated based on a level, and the sending, by the proxy coordination device, a DIO packet includes sending, by the proxy coordination device, the DIO packet after determining that the restriction parameter satisfies a threshold requirement. In this possible implementation, the restriction parameter is set such that the proxy coordination device can reject network access of the station device when the restriction parameter does not satisfy the threshold requirement, to ensure operation efficiency of the proxy coordination device. In this way, overall operation efficiency of a hybrid network is higher.

In a possible implementation of the first aspect, the DIO packet may further include first information, where the first information is used to indicate a restriction parameter type used as a restriction parameter, and the restriction parameter type includes any one or more of the following an ETX, an LQL, and a hop count. In this possible implementation, the proxy coordination device notifies, through the DIO packet, the station device of parameter types that are used as restriction parameters such that the station device measures a parameter value used as a restriction parameter, and determines, based on the parameter value measured by the station device, to access a specific proxy coordination device.

In a possible implementation of the first aspect, the method may further include receiving, by the proxy coordination device, second information sent by a central coordination device, where the second information is used to indicate a first link quality parameter type for determining the restriction parameter, and the first link quality parameter type includes any one or more of the following a proxy communication rate, proxy channel quality, and a level. Alternatively, the method may further include receiving, by the proxy coordination device, second information sent by a central coordination device, where the second information is used to indicate a first wireless quality parameter type used as the restriction parameter, and the first wireless quality parameter type includes any one or more of the following an ETX, an LQL, and a hop count. In this possible implementation, a link quality parameter type in the PLC network required for calculating the restriction parameter is determined by the central coordination device, and the central coordination device notifies the proxy coordination device of the link quality parameter type.

In a possible implementation of the first aspect, the ETX may be negatively correlated with the proxy communication rate.

In a possible implementation of the first aspect, the LQL may be negatively correlated with the proxy channel quality.

In a possible implementation of the first aspect, the level may be positively correlated with the hop count.

In a possible implementation of the first aspect, the calculating, by a proxy coordination device, a network access parameter based on a link quality parameter of the proxy coordination device in a PLC network may include calculating, by the proxy coordination device, the link overheads based on at least one of a proxy communication rate, proxy channel quality, and a level. In this possible implementation, the proxy coordination device directly calculates the link overheads based on the link quality parameter.

In a possible implementation of the first aspect, the method may further include sending, by the proxy coordination device, a function notification packet to a central coordination device, where the function notification packet is used to indicate that the proxy coordination device has a PLC-RF dual-mode function, and receiving, by the proxy coordination device, a function acknowledgement packet sent by the central coordination device, where the function acknowledgement packet is used to instruct the proxy coordination device to enable an RF function. In this possible implementation, the central coordination device performs interaction with the proxy coordination device through the function notification packet and the function acknowledgement packet such that the proxy coordination device enables the RF function, to implement hybrid networking in which the PLC network is used as a trunk and an RF network is used as a stub.

In a possible implementation of the first aspect, the method may further include receiving, by the proxy coordination device, third information sent by the central coordination device, where the third information is used to indicate a second link quality parameter type for determining the link overheads, and the second link quality parameter type includes any one or more of the following a proxy communication rate, proxy channel quality, and a level. Alternatively, the method may further include receiving, by the proxy coordination device, third information sent by the central coordination device, where the third information is used to indicate a second wireless quality parameter type for determining the link overheads, and the second wireless quality parameter type includes any one or more of the following an ETX, an LQL, and a hop count. In this possible implementation, a link quality parameter type in the PLC network required for calculating the link overheads is determined by the central coordination device, and the central coordination device notifies the proxy coordination device of the link quality parameter type.

According to a second aspect, a network access method for hybrid networking is provided, where the network access method may include receiving, by a station device, a DIO packet sent by a proxy coordination device, where the DIO packet includes link overheads, the link overheads are determined by the proxy coordination device based on a link quality parameter of the proxy coordination device in a PLC network, and the link overheads are used to indicate overheads for performing network access by the station device through the proxy coordination device based on RF communication, and determining, by the station device based on the link overheads, whether to perform network access through the proxy coordination device based on RF communication.

In the network access method for hybrid networking in the second aspect, the station device receives the DIO packet, where the DIO packet includes the link overheads, and the link overheads are calculated by the proxy coordination device based on the link quality parameter of the proxy coordination device in the PLC network, and are used to indicate link overheads for performing network access by the station device through the proxy coordination device based on RF communication such that the station device can select a better network access path based on the link overheads, helping to improve operation efficiency of a hybrid network.

In a possible implementation of the second aspect, the link overheads may be determined by the proxy coordination device based on the wireless quality parameter, and the wireless quality parameter may include any one or more of the following an ETX, an LQL, and a hop count, where the ETX is calculated based on a proxy communication rate of the proxy coordination device, the LQL is calculated based on proxy channel quality of the proxy coordination device, and the hop count is calculated based on a level of the proxy coordination device.

In a possible implementation of the second aspect, the DIO packet may further include first information, where the first information is used to indicate a restriction parameter type used as a restriction parameter, and the restriction parameter type includes any one or more of the following an ETX, an LQL, and a hop count.

In a possible implementation of the second aspect, the determining, by the station device based on the link overheads, whether to perform network access through the proxy coordination device based on RF communication may include determining, by the station device, a value of the restriction parameter based on the first information, and determining, by the station device based on the value of the restriction parameter and a value of the link overheads, whether to perform network access through the proxy coordination device based on RF communication.

In a possible implementation of the second aspect, the link overheads are calculated by the proxy coordination device based on at least one of a proxy communication rate, proxy channel quality, and a level.

According to a third aspect, a network access method for hybrid networking is provided, where the network access method may include receiving, by a central coordination device, a function notification packet sent by a proxy coordination device, where the function notification packet is used to indicate that the proxy coordination device has a PLC-RF dual-mode function, and sending, by the central coordination device, a function acknowledgement packet to the proxy coordination device, where the function acknowledgement packet is used to instruct the proxy coordination device to enable an RF function.

In the network access method for hybrid networking in the third aspect, the central coordination device performs interaction with the proxy coordination device through the function notification packet and the function acknowledgement packet such that the proxy coordination device enables the RF function, to implement hybrid networking in which a PLC network is used as a trunk and an RF network is used as a stub.

In a possible implementation of the third aspect, the method may further include sending, by the central coordination device, third information to the proxy coordination device, where the third information is used to indicate a second link quality parameter type for determining the link overheads, and the second link quality parameter type includes any one or more of the following a proxy communication rate, proxy channel quality, and a level.

In a possible implementation of the third aspect, the method may further include sending, by the central coordination device, third information to the proxy coordination device, where the third information is used to indicate a second wireless quality parameter type for determining the link overheads, and the second wireless quality parameter type includes any one or more of the following an ETX, an LQL, and a hop count.

In a possible implementation of the third aspect, the method may further include sending, by the central coordination device, second information to the proxy coordination device, where the second information is used to indicate a first link quality parameter type for determining a restriction parameter, and the first link quality parameter type includes any one or more of the following a proxy communication rate, proxy channel quality, and a level.

In a possible implementation of the third aspect, the method may further include sending, by the central coordination device, second information to the proxy coordination device, where the second information is used to indicate a first wireless quality parameter type used as a restriction parameter, and the first wireless quality parameter type includes any one or more of the following an ETX, an LQL, and a hop count.

According to a fourth aspect, this application provides a proxy coordination device configured to perform the method according to any one of the first aspect or the possible implementations of the first aspect. Specifically, the proxy coordination device may include a module configured to perform the method according to any one of the first aspect or the possible implementations of the first aspect.

According to a fifth aspect, this application provides a proxy coordination device, where the proxy coordination device includes a processor, a memory, and a communications interface, the memory is configured to store an instruction, and the processor is configured to execute the instruction stored in the memory such that the proxy coordination device performs the method according to any one of the first aspect or the possible implementations of the first aspect.

According to a sixth aspect, this application provides a station device configured to perform the method according to any one of the second aspect or the possible implementations of the second aspect. Specifically, the station device may include a module configured to perform the method according to any one of the second aspect or the possible implementations of the second aspect.

According to a seventh aspect, this application provides a station device, where the station device includes a processor, a memory, and a communications interface, the memory is configured to store an instruction, and the processor is configured to execute the instruction stored in the memory such that the station device performs the method according to any one of the second aspect or the possible implementations of the second aspect.

According to an eighth aspect, this application provides a central coordination device configured to perform the method according to any one of the third aspect or the possible implementations of the third aspect. Specifically, the central coordination device may include a module configured to perform the method according to any one of the third aspect or the possible implementations of the third aspect.

According to a ninth aspect, this application provides a central coordination device, where the central coordination device includes a processor, a memory, and a communications interface, the memory is configured to store an instruction, and the processor is configured to execute the instruction stored in the memory such that the central coordination device performs the method according to any one of the third aspect or the possible implementations of the third aspect.

According to a tenth aspect, this application provides a computer-readable storage medium, where the computer-readable storage medium stores an instruction, and when the instruction is run on a computer, the computer is enabled to perform the method according to any one of the first aspect or the possible implementations of the first aspect.

According to an eleventh aspect, this application provides a computer program product including an instruction, where when a computer runs the instruction in the computer program product, the computer performs the method according to any one of the first aspect or the possible implementations of the first aspect.

According to a twelfth aspect, this application provides a computer chip, and the computer chip enables a computer to perform the method according to any one of the first aspect or the possible implementations of the first aspect.

According to a thirteenth aspect, this application provides a computer-readable storage medium, where the computer-readable storage medium stores an instruction, and when the instruction is run on a computer, the computer is enabled to perform the method according to any one of the second aspect or the possible implementations of the second aspect.

According to a fourteenth aspect, this application provides a computer program product including an instruction, where when a computer runs the instruction in the computer program product, the computer performs the method according to any one of the second aspect or the possible implementations of the second aspect.

According to a fifteenth aspect, this application provides a computer chip, and the computer chip enables a computer to perform the method according to any one of the second aspect or the possible implementations of the second aspect.

According to a sixteenth aspect, this application provides a computer-readable storage medium, where the computer-readable storage medium stores an instruction, and when the instruction is run on a computer, the computer is enabled to perform the method according to any one of the third aspect or the possible implementations of the third aspect.

According to a seventeenth aspect, this application provides a computer program product including an instruction, where when a computer runs the instruction in the computer program product, the computer performs the method according to any one of the third aspect or the possible implementations of the third aspect.

According to an eighteenth aspect, this application provides a computer chip, and the computer chip enables a computer to perform the method according to any one of the third aspect or the possible implementations of the third aspect.

Beneficial effects that can be achieved by the second to the eighteenth aspects and corresponding possible implementations correspond to beneficial effects that can be achieved by the first aspect and the possible implementations of the first aspect.

It should be understood that, a wireless quality parameter in this application is a parameter for measuring communication quality in an RF network.

DESCRIPTION OF EMBODIMENTS

The following describes technical solutions of this application with reference to accompanying drawings.

A PLC technology is widely deployed in the fields of smart grids, intelligent home networks, and the like. The PLC technology is based on existing grid infrastructure and has low deployment costs. A PLC network carries a high-frequency low-voltage (usually less than 10 volts (V)) analog/digital signal on a 220 V/50 hertz (Hz) low-voltage home power line through modulation and demodulation, to implement coverage of an intelligent home network. A PLC modem is an example based on the PLC technology.

With the PLC technology, a public service company and a home user can conveniently perform bidirectional communication to monitor and control plug-in apparatuses such as an electricity meter and a street lamp. A communication frequency range of the PLC network is relatively wide. The PLC network is usually divided into two types a narrowband PLC (NBPLC) network and a broadband PLC (BBPLC) network. A conventional BBPLC network mostly operates above 12 megahertzs (MHz). At present, there have been a plurality of standards for the PLC technology internationally.

IEEE 1901.1 PLC (PLC-IoT) at a frequency band of 2 MHz to 12 MHz is being standardized. The PLC-IoT technology uses a frequency band of 2-12 MHz. Bandwidth and a transmission distance of the PLC-IoT technology is between those of NBPLC and conventional BBPLC. At present, the PLC-IoT technology has been applied in smart meter deployment. A PLC-IoT network can provide a bidirectional, real-time, high-speed, and secure communication channel. A point-to-point communication rate in the PLC-IoT network reaches 1 megabit per second (Mbps), and is far higher than an effective rate (<10 kilobits per second (kbps) that can be provided by a narrow-band PLC network.

Figure 1:
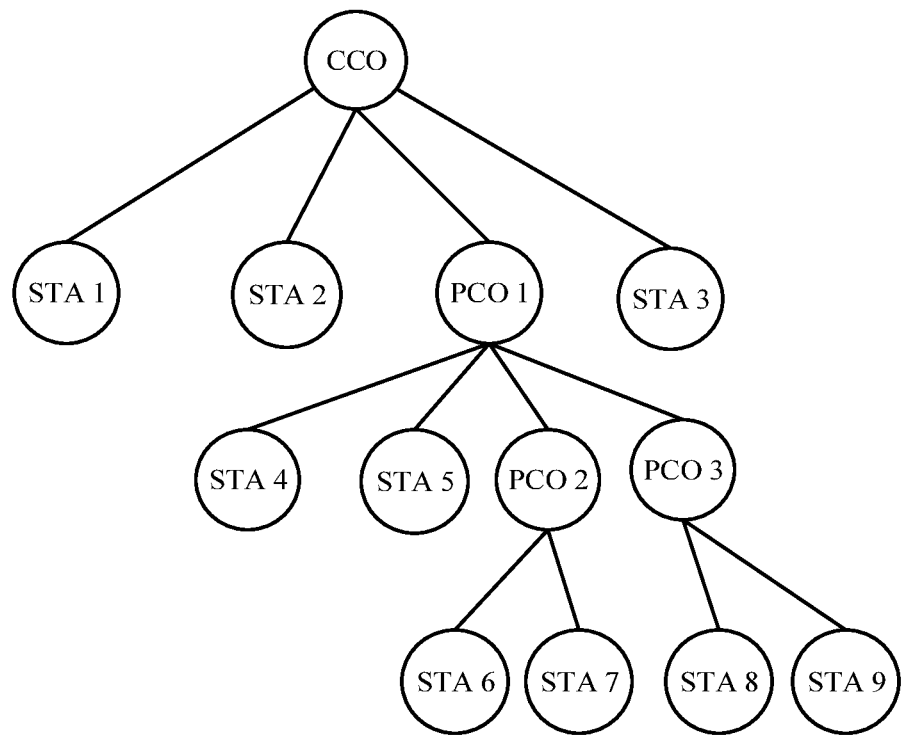
FIG. 1 is a schematic diagram of a topology structure of a typical PLC-IoT network according to an embodiment of this application.

In the PLC-IoT network, three device roles are defined a central coordinator (CCO), a proxy coordinator (PCO), and a station (STA). FIG. 1 is a schematic diagram of a topology structure of a typical PLC-IoT network according to an embodiment of this application. As shown in FIG. 1, the PLC-IoT network usually forms a hierarchical tree network in which a CCO is used as a center, a PCO (for example, PCO 1 to PCO 3) is connected to the CCO as a relay agent, and a STA (for example, STA 1 to STA 9) is connected to a PCO. The CCO is responsible for completing networking control, network maintenance, and other functions, and may be used as a gateway. The STA may implement functions of two roles a PCO and a STA. A device entity of the STA may be a communications unit disposed in an electric energy meter or a collector.

Figure 2:
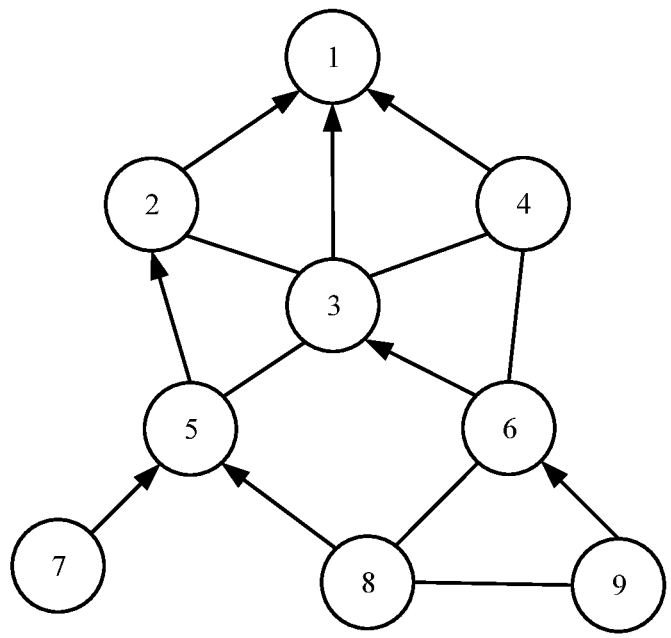
FIG. 2 is a schematic diagram of a topology structure of a typical RF network according to an embodiment of this application.

An RF network is also referred to as a low-speed RF mesh network, and usually uses a technical framework IPv6+ 6LoWPAN+IEEE802.15.4. IEEE 802.15.4 defines specifications for a physical layer and a data link layer such that IPv6 can seamlessly run over a low-speed network of IEEE802.15.4. The RF network supports establishment of a mesh network and implements routing and forwarding of an IPv6 packet. The IPv6 routing protocol for low-power and lossy networks (RPL) is a common routing protocol of the RF network. The RF network established according to the RPL uses layer 3 forwarding. FIG. 2 is a schematic diagram of a topology structure of a typical RF network according to an embodiment of this application. As shown in FIG. 2, the topology structure of the RF network is a directed oriented directed acyclic graph (DODAG). A node 1 is a central node and may be a gateway. Nodes 2, 3, 4, 5, and 6 are agent nodes. Nodes 7, 8, and 9 are frontier nodes.

After an agent node in the RF network completes network access, the agent node periodically delivers a directed acyclic graph information object (DIO) packet to notify its own information to wait for a new node to join in. The DIO packet may include a RANK value of the agent node, and the RANK value reflects overheads for performing network access through the agent node. In other words, an agent node with a smaller RANK value has lower costs for communication with a gateway. The RPL defines a plurality of manners of calculating a RANK value. For example, a RANK value is calculated using each of an ETX, a hop count (HopCount) (a hop count herein is a quantity of hops from a gateway), a LQL, and the like, or a RANK value is calculated using two or more of the foregoing parameters. In the RF network, during network access, a new node sends a destination advertisement object (DAO) packet to an agent node or a gateway to request to perform network access. If the agent node or the gateway accepts network access of the new node, the agent node or the gateway returns a DAO acknowledgement (DAO ACK) packet.

Hybrid networking of a PLC network and an RF network can make advantages of the two internet of things communications technologies complementary to each other. However, in China, both a physical layer and a link layer of a PLC-IoT network are quite different from those of an RF network. In the two networks, there are different packet formats, device network access processes, and routing manners. Therefore, it is quite difficult to implement hybrid networking of the PLC network and the RF network.

Considering that the PLC-IoT network is a BBPLC network and has enough bandwidth to carry a packet from an RF network, an embodiment of this application provides a method for hybrid networking using the PLC-IoT network as a trunk and the RF network as a stub. In the hybrid networking method, technical difficulty to be resolved is how to implement same link measurement for a proxy coordination device with a PLC-RF dual-mode function in the two networks. Specifically, the proxy coordination device with a PLC-RF dual-mode function is connected to a central coordination device (gateway) through a PLC link. After hybrid networking, a RANK value (an important parameter of the RF network) learned currently by each proxy coordination device from the RF network is 0. If a plurality of proxy coordination devices may accept network access of a new station device (RF node) during networking, because all RANK values are 0, the new station device randomly selects a proxy coordination device for association. As a result, the association is probably not an optimal connection scheme.

Figure 3:
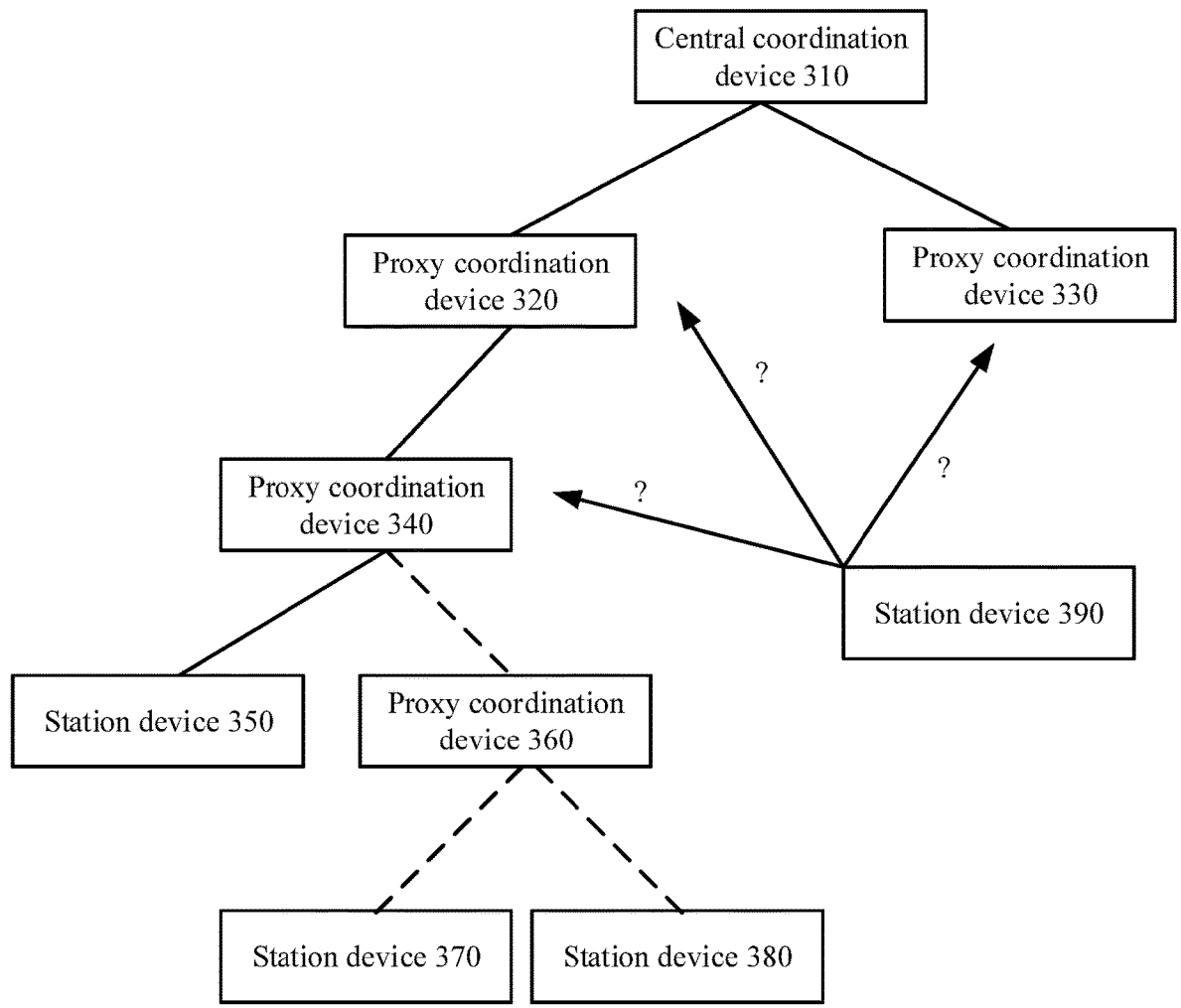
FIG. 3 is a schematic diagram of a hybrid network of a PLC-IoT network and an RF network according to an embodiment of this application.

FIG. 3 is a schematic diagram of a hybrid network of a PLC-IoT network and an RF network according to an embodiment of this application. As shown in FIG. 3, in the hybrid network, a proxy coordination device 320 and a proxy coordination device 330 are connected to a central coordination device 310 through PLC links. A proxy coordination device 340 is connected to the proxy coordination device 320 through a PLC link. A station device 350 is connected to the proxy coordination device 340 through a PLC link. A proxy coordination device 360 is connected to the proxy coordination device 340 through an RF link. A station device 370 and a station device 380 are connected to the proxy coordination device 360 through RF links. The proxy coordination device 320, the proxy coordination device 330, and the proxy coordination device 340 each have a PLC-RF dual-mode function, and RANK values learned by the proxy coordination devices from the RF network are all 0. The proxy coordination device 360 has been connected to a relatively large quantity of station devices through RF links, a new station device (RF node) 390 that is to perform network access may choose to be connected to any one of the proxy coordination device 320, the proxy coordination device 330, and the proxy coordination device 340 for network access. As a result, the connection is probably not an optimal connection scheme.

To optimize path selection during network access of a station device, in this embodiment of this application, a method for calculating a parameter such as a RANK value for a proxy coordination device with a PLC-RF dual-mode function is redefined, to distinguish overheads required for accepting a new station device by proxy coordination devices in a hybrid network.

It should be understood that, the method for hybrid networking in this embodiment of this application may be applied to a hybrid networking scheme of a PLC-IoT network and an RF network, or may be applied to a hybrid networking scheme of an IEEE 1901 PLC network and an RF network. In an embodiment, a PLC network in this specification may be an IEEE 1901.1 PLC network or may be an IEEE 1901 PLC network.

It should further be understood that, the central coordination device 310 in FIG. 3 may be corresponding to a CCO in a PLC network, the proxy coordination device 320, the proxy coordination device 330, and the proxy coordination device 340 may be corresponding to PCOs in the PLC network, the station device 350 may be corresponding to a STA in the PLC network, the station device 360 may be corresponding to an agent node in an RF network, the station device 370 and the station device 380 may be corresponding to frontier nodes in the RF network, and the station device 390 may be corresponding to a frontier node in the RF network that is to perform network access.

Figure 4:
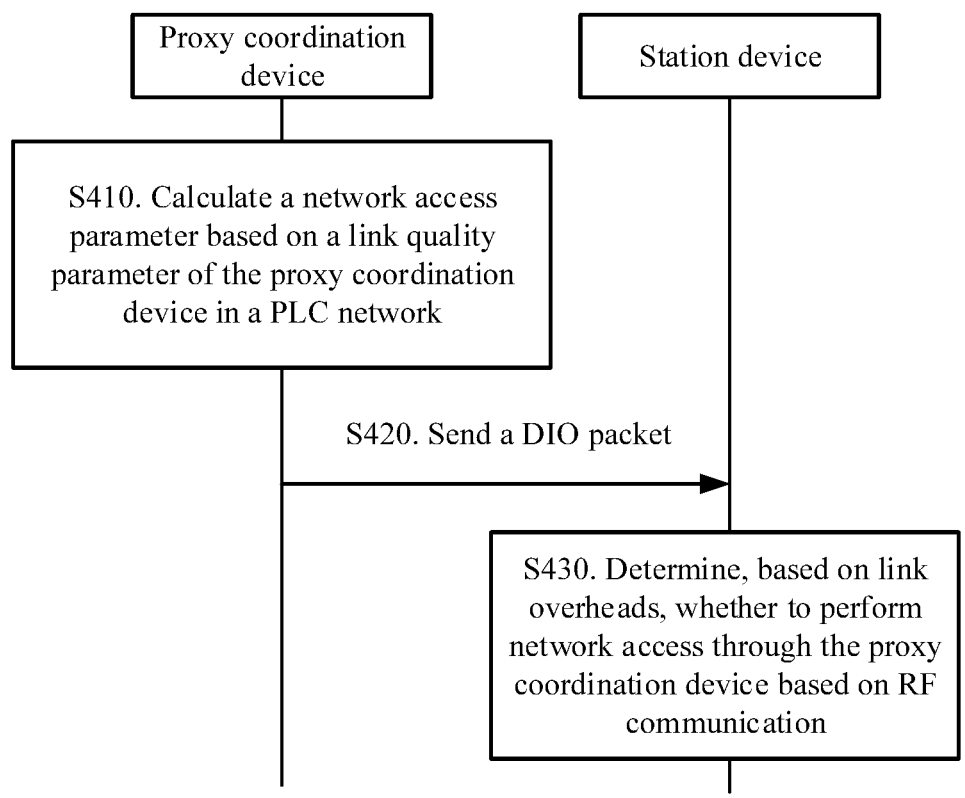
FIG. 4 is a schematic flowchart of a network access method for hybrid networking according to an embodiment of this application.

FIG. 4 is a schematic flowchart of a network access method 400 for a hybrid network according to an embodiment of this application. As shown in FIG. 4, the network access method 400 may include the following steps.

S410. A proxy coordination device calculates a network access parameter based on a link quality parameter of the proxy coordination device in a PLC network, where the network access parameter includes link overheads, and the link overheads are used to indicate overheads for performing network access by a station device through the proxy coordination device based on RF communication.

S420. The proxy coordination device sends a DIO packet, where the DIO packet includes link overheads. Correspondingly, the station device receives the DIO packet sent by the proxy coordination device. The link overheads may be determined by the proxy coordination device based on the link quality parameter of the proxy coordination device in the PLC network.

S430. The station device determines, based on the link overheads, whether to perform network access through the proxy coordination device based on RF communication.

In the network access method for hybrid networking in this embodiment of the this application, the proxy coordination device calculates, based on the link quality parameter of the proxy coordination device in the PLC network, the link overheads used to indicate overheads for performing network access by the station device through the proxy coordination device based on RF communication, and sends the link overheads to the station device through the DIO message, and the station device may determine, based on the link overheads, whether to perform network access through the proxy coordination device based on RF communication such that the station device can select a better network access path based on the link overheads, helping to improve operation efficiency of a hybrid network.

It should be understood that, in this embodiment of this application, the link overheads may be similar to a parameter RANK in an RF network, and indicate overheads for performing network access by the station device through the proxy coordination device based on RF communication.

Specifically, in a scenario in which a PLC network is used as a trunk and an RF network is used as a stub during hybrid networking of the PLC network and the RF network, the station device may perform network access through the proxy coordination device based on an RF link. The proxy coordination device may calculate a network access parameter based on a link quality parameter of the proxy coordination device at an underlying layer of the PLC network, where the link quality parameter includes link overheads. When confirming that an RF function is enabled, the proxy coordination device may broadcast a DIO packet in a single-hop mode or a multicast mode, and adds a value of link overheads of the proxy coordination device to the DIO packet. In this way, a station device waiting for performing network access may compare values of link overheads of different proxy coordination devices, and select an optimal proxy coordination device (that is, a parent node) based on the values of the link overheads of the different proxy coordination devices to access a hybrid network. After accessing the network, the station device sends, to the proxy coordination device through an RF link, an internet protocol (IP) packet to be sent to a central coordination device, and then the proxy coordination device adds data in the IP packet to a data packet, and sends the data packet to the central coordination device through a PLC link.

Optionally, the link quality parameter may include any one or more of the following a proxy communication rate, proxy channel quality, and a level. These link quality parameters may be obtained or measured in a process in which the proxy coordination device communicates with a network device in the PLC network. In a PLC-IoT network, the three parameters enumerated above are in a discover list (MMeDiscoverNodeList) packet periodically sent by the proxy coordination device (that is, a PCO) in a PLC link. It should be understood that, there are a plurality of link quality parameters in the PLC network that are used to measure quality of a PLC link, and the three parameters listed above are merely examples, and are not intended to limit this embodiment of this application.

A length of a field Proxy Communication Rate is 1 byte, and a value domain thereof is 0-100. The field Proxy Communication Rate is used to indicate a product of success rates of uplink and downlink communication between a STA sending an MMeDiscoverNodeList packet and a PCO of the STA. A field Proxy Channel Quality is used to indicate channel quality, evaluated by a STA sending an MMeDiscoverNodeList packet, from the STA to a PCO of the STA. The field Proxy Channel Quality is obtained through mapping of a signal-to-noise ratio (SNR) at a physical layer, and the SNR represents a signal-to-noise ratio of a carrier channel used for communication. A length of the field Proxy Channel Quality is 2 bytes, and a value domain thereof is 0-255. A field Level is used to indicate a level required when a STA sends an MMeDiscoverNodeList data packet to a CCO.

There are a plurality of specific implementations of determining link overheads based on a link quality parameter. The following provides detailed description.

Optionally, in addition to the link overheads, the network access parameter may further include a restriction parameter. A value of the restriction parameter is used to measure whether the proxy coordination device can accept network access of the station device. The value of the restriction parameter may also be used to constrain whether the proxy coordination device sends the DIO packet. Correspondingly, S420 of sending, by the proxy coordination device, a DIO packet may include sending, by the proxy coordination device, the DIO packet after determining that the restriction parameter satisfies a threshold requirement.

Optionally, the DIO packet may further include first information, where the first information is used to indicate a parameter type used as a restriction parameter, and the parameter type used as a restriction parameter may include any one or more of the following an ETX, an LQL, and a hop count. Specifically, the proxy coordination device may notify, through the DIO packet, the station device of parameter types that are used as restriction parameters such that the station device measures a parameter value used as a restriction parameter, and determines, based on the parameter value measured by the station device, to access a specific proxy coordination device. Correspondingly, S430 of determining, by the station device based on the link overheads, whether to perform network access through the proxy coordination device based on RF communication may include determining, by the station device, a value of the restriction parameter based on the first information, and determining, by the station device based on the value of the restriction parameter and a value of the link overheads, whether to perform network access through the proxy coordination device based on RF communication.

A specific implementation of determining the restriction parameter based on the link quality parameter is also described below in detail.

It should be understood that, which types of link quality parameters in the PLC network or which types of wireless quality parameters in the corresponding RF network determine the link overheads and the restriction parameter may be stipulated in a protocol or determined by the central coordination device.

When the network access parameter includes the restriction parameter, and a link quality parameter type in the PLC network required for calculating the restriction parameter is determined by the central coordination device, the network access method 400 may further include receiving, by the proxy coordination device, second information sent by the central coordination device, where the second information is used to indicate a first link quality parameter type for determining the restriction parameter, and the first link quality parameter type includes any one or more of the following a proxy communication rate, proxy channel quality, and a level. Alternatively, when the network access parameter includes the restriction parameter, and a wireless quality parameter type, corresponding to the restriction parameter, in the RF network is determined by the central coordination device, the network access method 400 may further include receiving, by the proxy coordination device, second information sent by the central coordination device, where the second information is used to indicate a first wireless quality parameter type used as the restriction parameter, and the first wireless quality parameter type includes any one or more of the following an ETX, an LQL, and a hop count.

When a link quality parameter type in the PLC network required for calculating the link overheads is determined by the central coordination device, the network access method 400 may further include receiving, by the proxy coordination device, third information sent by the central coordination device, where the third information is used to indicate a second link quality parameter type for determining the link overheads, and the second link quality parameter type includes any one or more of the following a proxy communication rate, proxy channel quality, and a level. Alternatively, when a wireless quality parameter type in the RF network required for calculating the link overheads is determined by the central coordination device, the network access method 400 may further include receiving, by the proxy coordination device, third information sent by the central coordination device, where the third information is used to indicate a second wireless quality parameter type for determining the link overheads, and the second wireless quality parameter type includes any one or more of the following an ETX, an LQL, and a hop count.

The following describes in detail how to calculate the link overheads and the restriction parameter.

Optionally, S410 of calculating, by a proxy coordination device, a network access parameter based on a link quality parameter of the proxy coordination device in a PLC network may include calculating, by the proxy coordination device, a wireless quality parameter based on the link quality parameter. The wireless quality parameter includes any one or more of the following an ETX, an LQL, and a hop count, where the ETX is calculated based on a proxy communication rate, the LQL is calculated based on proxy channel quality, and the hop count is calculated based on a level, and calculating, by the proxy coordination device, the link overheads based on the wireless quality parameter. In other words, the link overheads are determined based on the wireless quality parameter, where the wireless quality parameter is a parameter for measuring communication quality in the RF network. The wireless quality parameter may include any one or more of the following an ETX, an LQL, and a hop count. The ETX is calculated based on a proxy communication rate, the LQL is calculated on proxy channel quality, and the hop count is calculated based on a level.

Specifically, the proxy coordination device may calculate, based on the link quality parameter of the proxy coordination device in the PLC network, the wireless quality parameter in the corresponding RF network.

The ETX may be calculated based on Proxy Communication Rate in the PLC network. In other words, in the method in this embodiment of this application, Proxy Communication Rate may be mapped to the ETX. The ETX may be negatively correlated with Proxy Communication Rate. A calculated value of the ETX should not exceed a range within which the ETX should fall. For example, the ETX may be calculated according to the following formula $$ETX = m*f1(\text{Proxy Communication Rate})$$

where m is a positive integer, and f1( ) is a first mapping function and is a negative correlation function.

In a specific example, if m=100 and f1(x)=1/x, ETX=100/Proxy Communication Rate. In another specific example, if m=200 and f1(x)=1/x², ETX=200/(Rate Proxy Communication Rate). In still another specific example, if m=150 and f1(x)=1/(x+20), ETX=150/(Proxy Communication Rate+20). It should be understood that, the formulas listed above are examples and are not intended to limit this embodiment of this application.

The LQL may be calculated based on Proxy Channel Quality in the PLC network. In other words, in the method in this embodiment of this application, Proxy Channel Quality may be mapped to the LQL. The LQL may be negatively correlated with Proxy Channel Quality. A calculated value of the LQL should not exceed a range within which the LQL should fall. For example, the LQL may be calculated according to the following formula $$LQL = \begin{cases} 0, \text{if (Proxy Channel Quality)} = 0 \\ f2 \text{ (Proxy Channel Quality), else} \end{cases}$$

where f2( ) is a second mapping function, and f2( ) enables the LQL to be negatively correlated with Proxy Channel Quality.

In a specific example, if f2(x)=8−⌈x/37⌉, LQL=8−⌈Proxy Channel Quality/37⌉. In another specific example, $$LQL = \begin{cases} 0, \text{if (Proxy Channel Quality)} = 0 \\ 0, \text{if } 1 \leq \text{Proxy Channel Quality} \leq 31 \\ 8 - \text{floor (Proxy Channel Quality}/32), \text{else} \end{cases}$$

In still another specific example, a mapping relationship between Proxy Channel Quality and an LQL may be given in Table 1.

TABLE 1

Mapping relationship between Proxy Channel Quality and an LQL

| | Proxy Channel Quality | | | | | | | |
|---|---|---|---|---|---|---|---|---|
| | 0-31 | 32-63 | 64-95 | 96-127 | 128-159 | 160-191 | 192-223 | 224-255 |
| LQL | 0 | 7 | 6 | 5 | 4 | 3 | 2 | 1 |

It should be understood that, the formulas or table listed above are all examples and are not intended to limit this embodiment of this application.

HopCount may be calculated based on Level in the PLC network. In other words, in the method in this embodiment of this application, Level may be mapped to HopCount. HopCount may be positively correlated with Level. A calculated value of HopCount should not exceed a range within which HopCount should fall. For example, HopCount may be calculated according to the following formula $$HopCount = a*Level + b$$

where a is a positive integer, and b is an integer.

For example, if a=1 and b=0, HopCount=Level. In another specific example, if a=2 and b=1, HopCount=2Level+1. It should be understood that, the foregoing formulas are examples and are not intended to limit this embodiment of this application.

The foregoing provides a manner of obtaining the wireless quality parameter. For example, Proxy Communication Rate may be mapped to an ETX, Proxy Channel Quality may be mapped to an LQL, and Level may be mapped to HopCount. The wireless quality parameter may include any one or more of an expected transmission count ETX, a link quality level LQL, and a hop count. In the following, several examples are used to describe how to calculate the link overheads based on the wireless quality parameter.

The wireless quality parameter may include an ETX. In a method for calculating the link overheads, the ETX is a main parameter, and the ETX needs to be considered during path selection. For example, link overheads=c*ETX, where c is a positive constant.

When a DIO packet cannot be transmitted on a PLC link hop by hop or interpreted, HopCount may also be used as an option for calculating link overheads. In this case, the wireless quality parameter may include an ETX and Hop-Count. For example, link overheads=d*ETX*HopCount, where d is a positive constant. In other words, the link overheads are obtained by multiplying the ETX with Hop-Count.

When the proxy coordination device may generate a DIO packet, and the DIO packet may be transmitted on a PLC link hop by hop and interpreted, a value of the link overheads may be calculated based on a value of link overheads of a last-hop node. For example, link overheads=value of link overheads of a last-hop node+e*ETX, where e is a positive constant. In other words, a value of link overheads is a sum of a value of link overheads of a last hop and an ETX of the last hop.

It should be understood that, the foregoing cases described above are merely examples and are not intended to limit this embodiment of this application.

Optionally, S410 of calculating, by a proxy coordination device, a network access parameter based on a link quality parameter of the proxy coordination device in a PLC network may include calculating, by the proxy coordination device, the link overheads based on at least one of a proxy communication rate, proxy channel quality, and a level. In other words, the proxy coordination device directly calculates the link overheads based on the link quality parameter.

The proxy coordination device may calculate the link overheads based on Proxy Communication Rate. For example, link overheads=f/Proxy Communication Rate, where f is a positive constant.

When a DIO packet cannot be transmitted on a PLC link hop by hop or interpreted, Level may also be used as an option for calculating link overheads. In other words, the proxy coordination device may calculate the link overheads based on Proxy Communication Rate and Level. For example, link overheads=g*Level/Proxy Communication Rate, where g is a positive constant.

The proxy coordination device may directly calculate the link overheads based on the link quality parameter of the proxy coordination device in the PLC network. Specifically, the proxy coordination device may calculate the link overheads based on at least one of Proxy Communication Rate, Proxy Channel Quality, and Level. For example, link overheads=h*Level/Proxy Communication Rate+k/Proxy Channel Quality, where h and k are positive constants.

It should be understood that, an effect obtained by the solution in which the wireless quality parameter is first calculated based on the link quality parameter of the proxy coordination device in the PLC network and then the link overheads are calculated based on the wireless quality parameter is equivalent to that obtained by the solution in which the link overheads are directly calculated based on the link quality parameter of the proxy coordination device in the PLC network. In the former solution, the calculation formulas of the ETX, the LQL, and HopCount may be substituted into the calculation formula of the link overheads to obtain an operation relationship between the link quality parameter and the link overheads. In the later solution, the formula for calculating the link overheads using the link quality parameter may be decomposed to obtain an operation relationship between the wireless quality parameter and the link overheads.

As mentioned above, the network access parameter may further include a constraint parameter. A parameter type used as the constraint parameter may include any one or more of the following an expected transmission count ETX, a link quality level LQL, and a hop count. The foregoing further mentions that Proxy Communication Rate may be mapped to the ETX, Proxy Channel Quality may be mapped to the LQL, and Level may be mapped to HopCount. Correspondingly, a parameter type of the link quality parameter for determining the restriction parameter may include any one or more of the following a proxy communication rate, proxy channel quality, and a level.

In a specific example, the LQL may be used as the restriction parameter. A protocol or a system may specify a threshold. For example, the threshold is 5. The proxy coordination device determines whether a value of the restriction parameter satisfies a threshold requirement. If the value of the restriction parameter does not satisfy the threshold requirement, the proxy coordination device does not send a DIO packet. For example, a proxy coordination device with an LQL greater than the threshold (the LQL is 6 or 7) does not accept a station device, that is, the proxy coordination device does not send a DIO packet. It the value of the restriction parameter satisfies the threshold requirement, the proxy coordination device sends a DIO packet. For example, a proxy coordination device with an LQL less than or equal to the threshold (the LQL is 1 to 5) sends a DIO packet, where the DIO packet includes a value of link overheads and further includes first information used to indicate a parameter type used as the restriction parameter. In the example, the parameter type indicated by the first information and used as the restriction parameter is an LQL. The station device determines a value of the restriction parameter based on the first information. The station device determines, based on the value of the restriction parameter and the value of the link overheads, whether to perform network access through the proxy coordination device based on RF communication. Specifically, the station device measures a value of the LQL or obtains the value of the LQL from the RF network. For example, if the value of the LQL obtained by the station device is 6 and does not satisfy the threshold requirement, the station device does not perform network access through the proxy coordination device, but performs network access through another proxy coordination device or does not perform network access. For example, if the value of the LQL obtained by the station device is 4 and satisfies the threshold requirement, the station device compares values of link overheads to select a proxy coordination device with a relatively small value of link overheads to perform network access.

It should be understood that, other parameters in the RF network may also be used as restriction parameters. The restriction parameter may include one parameter or may include a plurality of parameters. Examples are not further provided herein.

Figure 5:
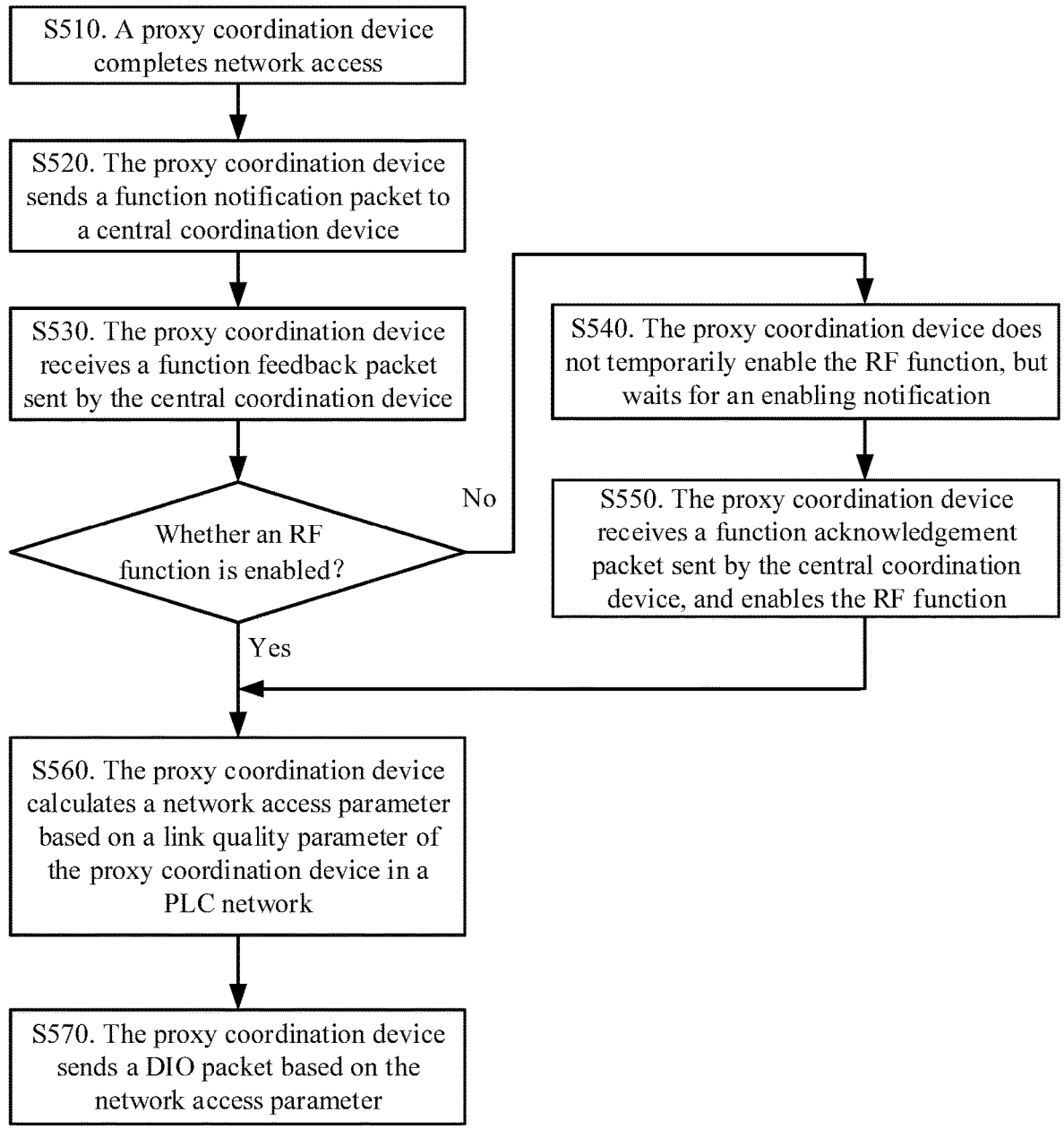
FIG. 5 is a schematic flowchart of another network access method for hybrid networking according to an embodiment of this application.

FIG. 5 is a schematic flowchart of another network access method 500 for a hybrid network according to an embodiment of this application. As shown in FIG. 5, the network access method 500 is performed by a proxy coordination device, and may include the following steps.

S510. The proxy coordination device completes network access. Specifically, during network access, the proxy coordination device completes network access on a PLC link through a central coordination device and a PLC interface according to a process specified in a PLC network protocol.

S520. The proxy coordination device sends a function notification packet to the central coordination device. Correspondingly, the central coordination device receives the function notification packet sent by the proxy coordination device. The function notification packet is used to indicate that the proxy coordination device has a PLC-RF dual-mode function. Specifically, the proxy coordination device sends an IP packet to the central coordination device to notify that the proxy coordination device has a PLC-RF dual-mode function.

S530. The proxy coordination device receives a function feedback packet sent by the central coordination device.

The central coordination device sends the function feedback packet to the proxy coordination device. The function feedback packet may be used to instruct the proxy coordination device to enable an RF function, and in this case, the function feedback packet may also be referred to as a function acknowledgement packet. The function acknowledgement packet may include the third information mentioned above that is used to indicate a second link quality parameter type for determining link overheads. The function acknowledgement packet may include the second information mentioned above that is used to indicate a first link quality parameter type for determining a restriction parameter. The function acknowledgement packet may also be used to indicate that the proxy coordination device does not enable the RF function temporarily but is in a standby state. When it is determined that the RF function is enabled, S560 is directly performed. When it is determined that the proxy coordination device is in the standby state, S540 is performed.

S540. The proxy coordination device does not temporarily enable an RF function, but waits for an enabling notification.

S550. The proxy coordination device receives a function acknowledgement packet sent by the central coordination device, and enables the RF function.

S560. After calculating a network access parameter based on a link quality parameter of the proxy coordination device in a PLC network, the proxy coordination device performs S570, where the network access parameter includes link overheads.

S570. The proxy coordination device sends a DIO packet, where the DIO packet includes a value of the link overheads. Specifically, the proxy coordination device broadcasts the DIO packet in a single-hop mode or a multicast mode, to prepare for accepting a station device.

Figure 6:
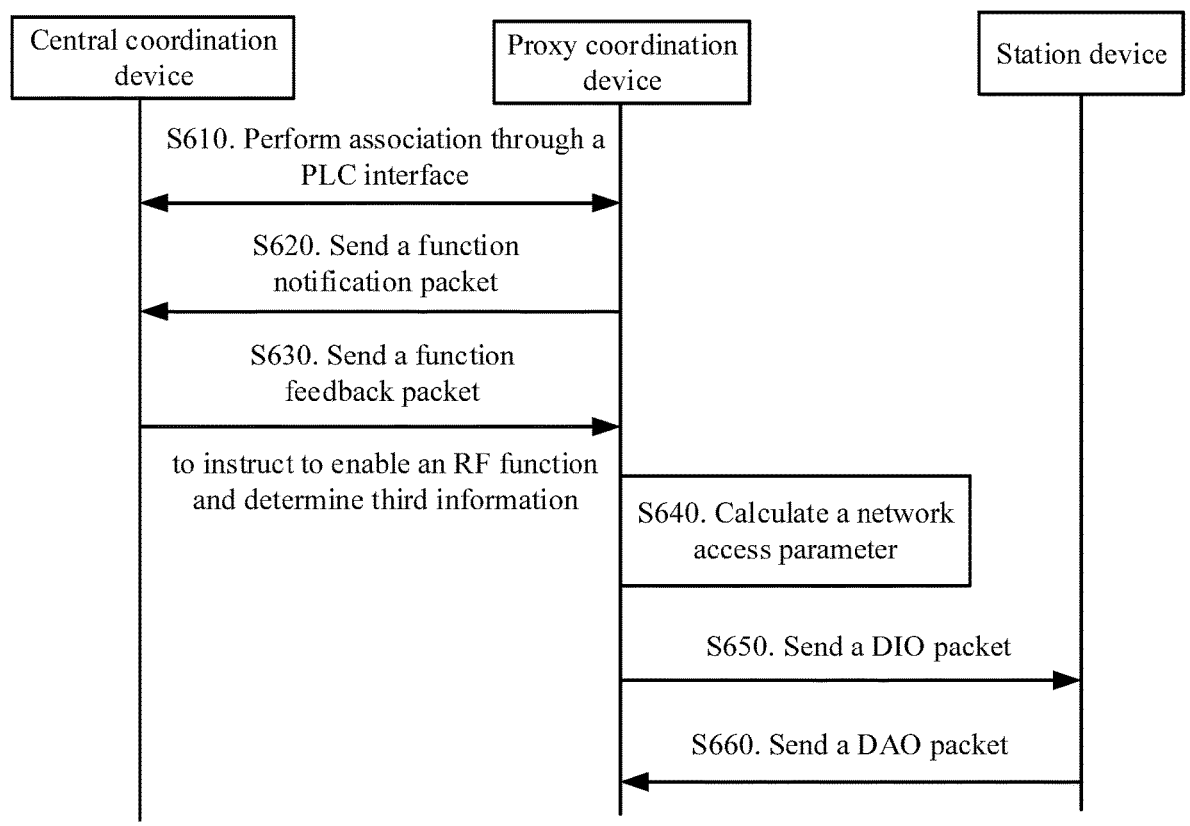
FIG. 6 is a schematic flowchart of still another network access method for hybrid networking according to an embodiment of this application.

The schematic flowchart of the network access method 500 shown in FIG. 5 provides two examples in which the proxy coordination device and the station device simultaneously perform network access and the station device performs network access later than the proxy coordination device. FIG. 6 is a schematic flowchart of still another network access method 600 for a hybrid network according to an embodiment of this application. The network access method 600 shown in FIG. 6 is based on a case in which a proxy coordination device and a station device simultaneously perform network access. The network access method 600 may include the following steps.

S610. The proxy coordination device is associated with a central coordination device through a PLC interface.

S620. The proxy coordination device sends a function notification packet to the central coordination device. Correspondingly, the central coordination device receives the function notification packet sent by the proxy coordination device.

S630. The central coordination device sends a function feedback packet to the proxy coordination device.

The function feedback packet (that is, a function acknowledgement packet) is used to instruct the proxy coordination device to enable an RF function. The function acknowledgement packet includes third information used to indicate a second link quality parameter type for determining link overheads. The function acknowledgement packet in the example shown in FIG. 6 does not include second information used to indicate a first link quality parameter type for determining a restriction parameter. In another example, the function acknowledgement packet may include second information. It should be understood that, the second information and the third information may be carried in the function acknowledgement packet or may be separately sent.

S640. The proxy coordination device calculates a network access parameter. Specifically, the proxy coordination device calculates the network access parameter based on a link quality parameter of the proxy coordination device in a PLC network, where the network access parameter includes link overheads.

S650. The proxy coordination device sends a DIO packet. The function acknowledgement packet in the example shown in FIG. 6 does not include second information. Therefore, the proxy coordination device directly sends the DIO packet without considering a restriction parameter. The DIO packet includes a value of the link overheads. In another example, the proxy coordination device may consider a restriction parameter. When a constraint condition does not satisfy a threshold requirement, the proxy coordination device does not send a DIO packet. When the constraint condition satisfies the threshold requirement, the proxy coordination device sends a DIO packet. The sending a DIO packet may be broadcasting the DIO packet in a single-hop mode or a multicast mode.

S660. The station device sends a DAO packet to the proxy coordination device. In the example shown in FIG. 6, the station device chooses to perform network access through the proxy coordination device based on the link overheads. Certainly, in another example, the station device may not perform network access through the proxy coordination device. Therefore, the station device does not need to send a DAO packet to the proxy coordination device.

Figure 7:
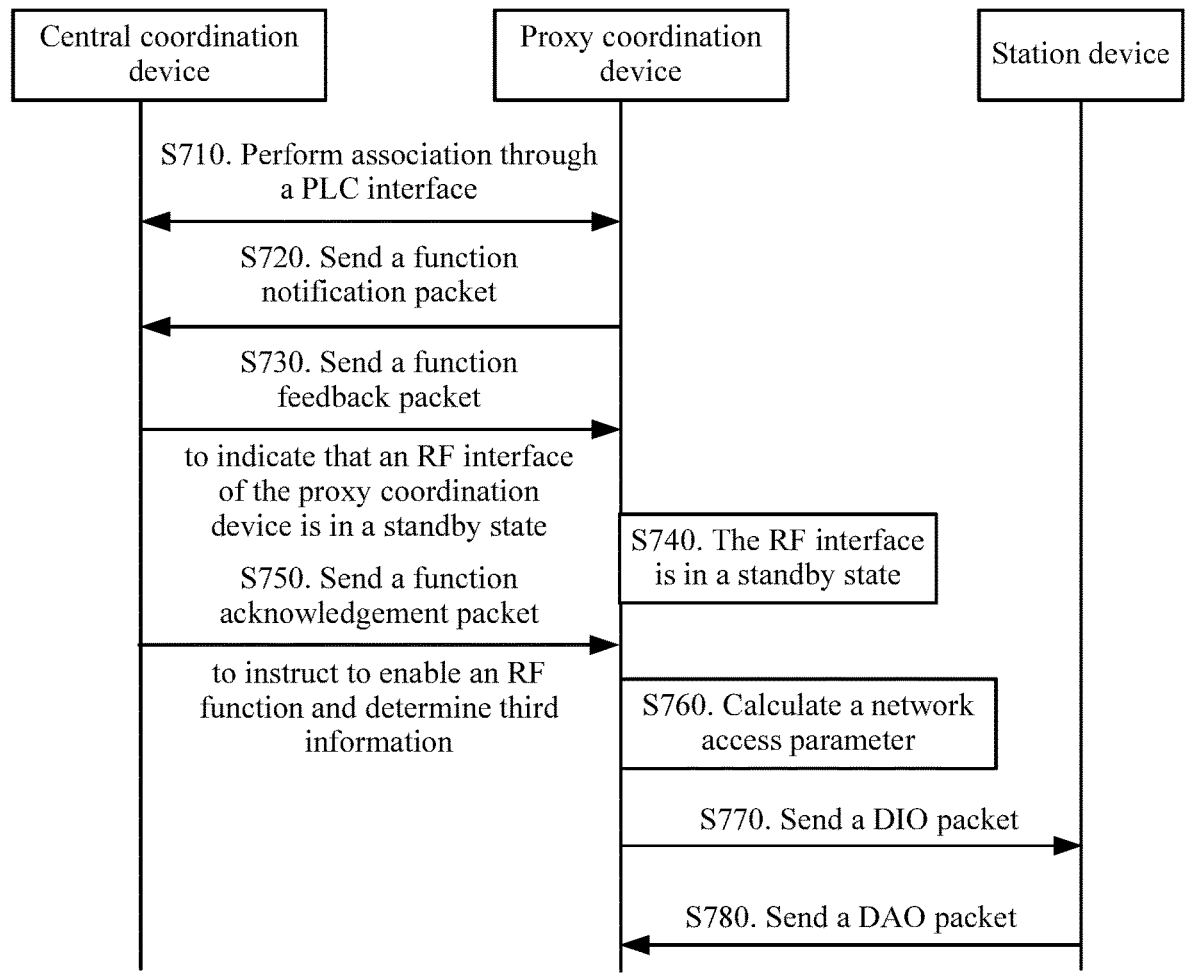
FIG. 7 is a schematic flowchart of still another network access method for hybrid networking according to an embodiment of this application.

FIG. 7 is a schematic flowchart of still another network access method 700 for a hybrid network according to an embodiment of this application. The network access method 700 shown in FIG. 7 is based on a case in which a station device performs network access later than a proxy coordination device. The network access method 700 may include the following steps.

S710. The proxy coordination device is associated with a central coordination device through a PLC interface.

S720. The proxy coordination device sends a function notification packet to the central coordination device. Correspondingly, the central coordination device receives the function notification packet sent by the proxy coordination device.

S730. The central coordination device sends a function feedback packet to the proxy coordination device. The function acknowledgement packet is used to indicate that the proxy coordination device does not enable the RF function temporarily but is in a standby state.

S740. An RF interface of the proxy coordination device is in a standby state.

S750. The central coordination device sends a function acknowledgement packet to the proxy coordination device. The function acknowledgement packet includes third information used to indicate a second link quality parameter type for determining link overheads. The function acknowledgement packet in the example shown in FIG. 7 does not include second information used to indicate a first link quality parameter type for determining a restriction parameter. In another example, the function acknowledgement packet may include second information. It should be understood that, the second information and the third information may be carried in the function acknowledgement packet or may be separately sent.

S760. The proxy coordination device calculates a network access parameter. Specifically, the proxy coordination device calculates the network access parameter based on a link quality parameter of the proxy coordination device in a PLC network, where the network access parameter includes link overheads.

S770. The proxy coordination device sends a DIO packet. The function acknowledgement packet in the example shown in FIG. 7 does not include second information. Therefore, the proxy coordination device directly sends the DIO packet without considering a restriction parameter. The DIO packet includes a value of the link overheads. In another example, the proxy coordination device may consider a restriction parameter. When a constraint condition does not satisfy a threshold requirement, the proxy coordination device does not send a DIO packet. When the constraint condition satisfies the threshold requirement, the proxy coordination device sends a DIO packet. The sending a DIO packet may be broadcasting the DIO packet in a single-hop mode or a multicast mode.

S780. The station device sends a DAO packet to the proxy coordination device. In the example shown in FIG. 7, the station device chooses to perform network access through the proxy coordination device based on the link overheads. Certainly, in another example, the station device may not perform network access through the proxy coordination device. Therefore, the station device does not need to send a DAO packet to the proxy coordination device.

The foregoing describes the network access method for hybrid networking provided in the embodiments of this application. The following describes a proxy coordination device, a station device, and a central coordination device provided in the embodiments of this application.

Figure 8:
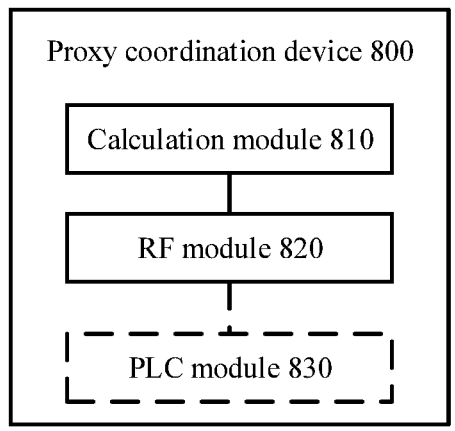
FIG. 8 is a schematic block diagram of a proxy coordination device according to an embodiment of this application.

FIG. 8 is a schematic block diagram of a proxy coordination device 800 according to an embodiment of this application. The proxy coordination device 800 includes a calculation module 810 and an RF module 820. The calculation module 810 is configured to calculate a network access parameter based on a link quality parameter of the proxy coordination device 800 in a PLC network. The network access parameter includes link overheads, and the link overheads are used to indicate overheads for performing network access by a station device through the proxy coordination device 800 based on RF communication. The RF module 820 is configured to send a DIO packet. The DIO packet includes the link overheads.

The proxy coordination device in this embodiment of this application calculates, based on the link quality parameter of the proxy coordination device in the PLC network, the link overheads used to indicate overheads for performing network access by the station device through the proxy coordination device based on RF communication, and sends the link overheads to the station device through the DIO packet such that the station device can select a better network access path based on the link overheads, helping to improve operation efficiency of a hybrid network.

Optionally, the calculation module 810 may be further configured to calculate a wireless quality parameter based on the link quality parameter, where the wireless quality parameter includes any one or more of the following an ETX, an LQL, and a hop count, where the ETX is calculated based on a proxy communication rate, the LQL is calculated based on proxy channel quality, and the hop count is calculated based on a level, and calculate the link overheads based on the wireless quality parameter.

Optionally, the network access parameter may further include a restriction parameter, and the restriction parameter may include any one or more of the following an ETX, an LQL, and a hop count. The ETX is calculated based on a proxy communication rate, the LQL is calculated based on proxy channel quality, and the hop count is calculated based on a level. The RF module 820 may be further configured to send the DIO packet after determining that the restriction parameter satisfies a threshold requirement.

Optionally, the DIO packet may further include first information. The first information is used to indicate a restriction parameter type used as a restriction parameter, and the restriction parameter type includes any one or more of the following an ETX, an LQL, and a hop count.

Optionally, the proxy coordination device 800 may further include a PLC module 830. The PLC module 830 may be configured to receive second information sent by a central coordination device. The second information is used to indicate a first link quality parameter type for determining the restriction parameter, and the first link quality parameter type includes any one or more of the following a proxy communication rate, proxy channel quality, and a level. Alternatively, the PLC module 830 may be configured to receive second information sent by a central coordination device. The second information is used to indicate a first wireless quality parameter type used as the restriction parameter, and the first wireless quality parameter type includes any one or more of the following an ETX, an LQL, and a hop count.

Optionally, the ETX is negatively correlated with the proxy communication rate.

Optionally, the LQL is negatively correlated with the proxy channel quality.

Optionally, the level is positively correlated with the hop count.

Optionally, the calculation module 810 may be further configured to calculate the link overheads based on at least one of a proxy communication rate, proxy channel quality, and a level.

Optionally, the PLC module 830 is further configured to send a function notification packet to a central coordination device, where the function notification packet is used to indicate that the proxy coordination device 800 has a PLC-RF dual-mode function, and receive a function acknowledgement packet sent by the central coordination device, where the function acknowledgement packet is used to instruct the proxy coordination device 800 to enable an RF function.

The PLC module 830 may be further configured to receive third information sent by the central coordination device. The third information is used to indicate a second link quality parameter type for determining the link overheads, and the second link quality parameter type includes any one or more of the following a proxy communication rate, proxy channel quality, and a level. Alternatively, the PLC module 830 may be further configured to receive third information sent by the central coordination device. The third information is used to indicate a second wireless quality parameter type for determining the link overheads, and the second wireless quality parameter type includes any one or more of the following an ETX, an LQL, and a hop count.

Figure 9:
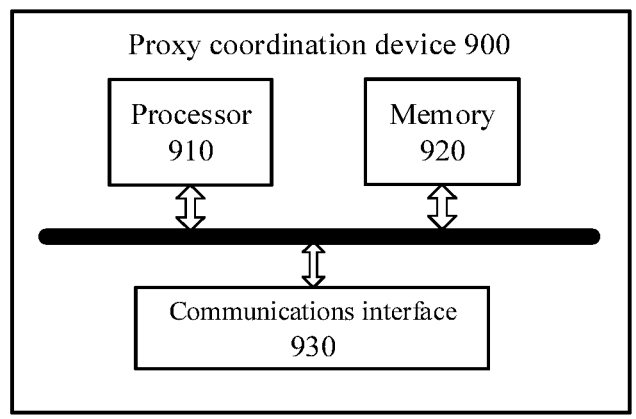
FIG. 9 is a schematic structural diagram of a proxy coordination device according to an embodiment of this application.

FIG. 9 is a schematic structural diagram of a proxy coordination device 900 according to an embodiment of this application. The proxy coordination device 900 shown in FIG. 9 may include a processor 910, a memory 920, and a communications interface 930.

The communications interface 930 is configured to communicate with another device in a hybrid network. The communications interface 930 includes a wired communications interface and a wireless communications interface. The wired communications interface includes a PLC interface, and may further include an Ethernet interface. The Ethernet interface may be an optical interface, an electrical interface, or a combination thereof. The wireless communications interface includes an RF interface.

The memory 920 stores a computer instruction. When the processor 910 executes the computer instruction, the proxy coordination device 900 is enabled to perform the following steps calculating a network access parameter based on a link quality parameter of the proxy coordination device 900 in a PLC network, where the network access parameter includes link overheads, and the link overheads are used to indicate overheads for performing network access by a station device through the proxy coordination device 900 based on RF communication, and sending a DIO packet, where the DIO packet includes the link overheads.

Optionally, when the processor 910 executes the computer instruction, the proxy coordination device 900 is enabled to specifically perform the following steps calculating a wireless quality parameter based on the link quality parameter, where the wireless quality parameter includes any one or more of the following an ETX, an LQL, and a hop count, where the ETX is calculated based on a proxy communication rate, the LQL is calculated based on proxy channel quality, and the hop count is calculated based on a level, and calculating the link overheads based on the wireless quality parameter.

Optionally, the network access parameter further includes a restriction parameter, and the restriction parameter includes any one or more of the following an ETX, an LQL, and a hop count. The ETX is calculated based on a proxy communication rate, the LQL is calculated based on proxy channel quality, and the hop count is calculated based on a level. When the processor 910 executes the computer instruction, the proxy coordination device 900 is enabled to specifically perform the following step sending the DIO packet after determining that the restriction parameter satisfies a threshold requirement.

Optionally, the DIO packet further includes first information. The first information is used to indicate a restriction parameter type used as a restriction parameter, and the restriction parameter type includes any one or more of the following an ETX, an LQL, and a hop count.

Optionally, the processor 910 is further configured to execute the computer instruction such that the proxy coordination device 900 is enabled to perform the following step receiving second information sent by a central coordination device. The second information is used to indicate a first link quality parameter type for determining the restriction parameter, and the first link quality parameter type includes any one or more of the following a proxy communication rate, proxy channel quality, and a level. Alternatively, the processor 910 is further configured to execute the computer instruction such that the proxy coordination device 900 is enabled to perform the following step receiving second information sent by a central coordination device. The second information is used to indicate a first wireless quality parameter type used as the restriction parameter, and the first wireless quality parameter type includes any one or more of the following an ETX, an LQL, and a hop count.

Optionally, the ETX is negatively correlated with the proxy communication rate.

Optionally, the LQL is negatively correlated with the proxy channel quality.

Optionally, the level is positively correlated with the hop count.

Optionally, the memory 920 stores a computer instruction. When the processor 910 executes the computer instruction, the proxy coordination device 900 is enabled to perform the following step calculating the link overheads based on at least one of a proxy communication rate, proxy channel quality, and a level.

Optionally, the processor 910 is further configured to execute the computer instruction such that the proxy coordination device 900 is enabled to perform the following steps sending a function notification packet to a central coordination device, where the function notification packet is used to indicate that the proxy coordination device 900 has a PLC-RF dual-mode function, and receiving a function acknowledgement packet sent by the central coordination device, where the function acknowledgement packet is used to instruct the proxy coordination device 900 to enable an RF function.

Optionally, the processor 910 is further configured to execute the computer instruction such that the proxy coordination device 900 is enabled to perform the following step receiving third information sent by the central coordination device. The third information is used to indicate a second link quality parameter type for determining the link overheads, and the second link quality parameter type includes any one or more of the following a proxy communication rate, proxy channel quality, and a level. Alternatively, the processor 910 is further configured to execute the computer instruction such that the proxy coordination device 900 is enabled to perform the following step receiving third information sent by the central coordination device. The third information is used to indicate a second wireless quality parameter type for determining the link overheads, and the second wireless quality parameter type includes any one or more of the following an ETX, an LQL, and a hop count.

It should be understood that the proxy coordination device 800 shown in FIG. 8 or the proxy coordination device 900 shown in FIG. 9 may be configured to perform operations or procedures in the foregoing method embodiments, and operations and/or functions of the modules or components in the proxy coordination device 800 or the proxy coordination device 900 are respectively intended for implementing corresponding procedures in the foregoing method embodiments. For brevity, details are not described herein again.

Figure 10:
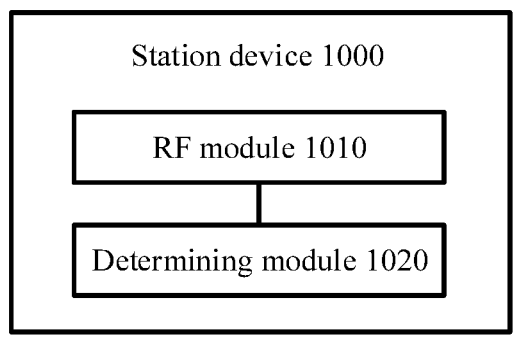
FIG. 10 is a schematic block diagram of a station device according to an embodiment of this application.

FIG. 10 is a schematic block diagram of a station device 1000 according to an embodiment of this application. The station device 1000 includes an RF module 1010 and a determining module 1020. The RF module 1010 is configured to receive a DIO packet sent by a proxy coordination device. The DIO packet includes link overheads, the link overheads are determined by the proxy coordination device based on a link quality parameter of the proxy coordination device in a PLC network, and the link overheads are used to indicate overheads for performing network access by the station device 1000 through the proxy coordination device based on RF communication. The determining module 1020 is configured to determine, based on the link overheads, whether to perform network access through the proxy coordination device based on RF communication.

The station device in this embodiment of this application receives the DIO packet. The DIO packet includes the link overheads, and the link overheads are calculated by the proxy coordination device based on the link quality parameter of the proxy coordination device in the PLC network, and are used to indicate link overheads for performing network access by the station device through the proxy coordination device based on RF communication such that the station device can select a better network access path based on the link overheads, helping to improve operation efficiency of a hybrid network.

Optionally, the link overheads are determined by the proxy coordination device based on a wireless quality parameter, and the wireless quality parameter includes any one or more of the following an ETX, an LQL, and a hop count. The ETX is calculated based on a proxy communication rate of the proxy coordination device, the LQL is calculated based on proxy channel quality of the proxy coordination device, and the hop count is calculated based on a level of the proxy coordination device.

Optionally, the DIO packet further includes first information. The first information is used to indicate a restriction parameter type used as a restriction parameter, and the restriction parameter type includes any one or more of the following an ETX, an LQL, and a hop count.

Optionally, the determining module 1020 is further configured to determine a value of the restriction parameter based on the first information, and determine, based on the value of the restriction parameter and a value of the link overheads, whether to perform network access through the proxy coordination device based on RF communication.

Optionally, the ETX is negatively correlated with the proxy communication rate.

Optionally, the LQL is negatively correlated with the proxy channel quality.

Optionally, the level is positively correlated with the hop count.

Optionally, the link overheads are calculated by the proxy coordination device based on at least one of a proxy communication rate, proxy channel quality, and a level.

Figure 11:
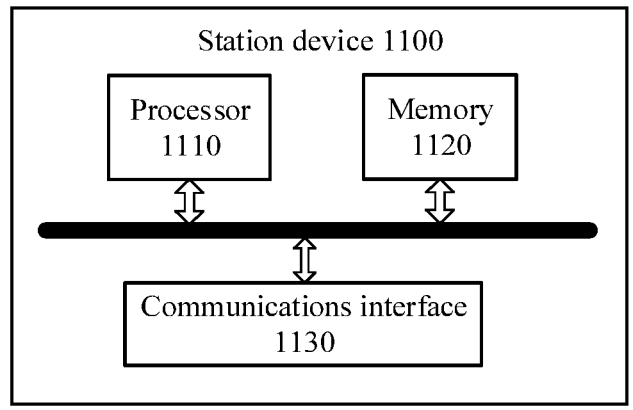
FIG. 11 is a schematic structural diagram of a station device according to an embodiment of this application.

FIG. 11 is a schematic structural diagram of a station device 1100 according to an embodiment of this application. The station device 1100 shown in FIG. 11 may include a processor 1110, a memory 1120, and a communications interface 1130.

The communications interface 1130 is configured to communicate with another device in a hybrid network. The communications interface 1130 includes a wireless communications interface. The wireless communications interface includes an RF interface. The communications interface 1130 may further include a wired communications interface. The wired communications interface includes a PLC interface, and may further include an Ethernet interface. The Ethernet interface may be an optical interface, an electrical interface, or a combination thereof.

The memory 1120 stores a computer instruction. When the processor 1110 executes the computer instruction, the station device 1100 is enabled to perform the following steps receiving a DIO packet sent by a proxy coordination device, where the DIO packet includes link overheads, the link overheads are determined by the proxy coordination device based on a link quality parameter of the proxy coordination device in a PLC network, and the link overheads are used to indicate overheads for performing network access by the station device through the proxy coordination device based on RF communication, and determining, based on the link overheads, whether to perform network access through the proxy coordination device based on RF communication.

Optionally, the link overheads are determined by the proxy coordination device based on a wireless quality parameter, and the wireless quality parameter includes any one or more of the following an ETX, an LQL, and a hop count. The ETX is calculated based on a proxy communication rate of the proxy coordination device, the LQL is calculated based on proxy channel quality of the proxy coordination device, and the hop count is calculated based on a level of the proxy coordination device.

Optionally, the DIO packet further includes first information. The first information is used to indicate a restriction parameter type used as a restriction parameter, and the restriction parameter type includes any one or more of the following an ETX, an LQL, and a hop count.

Optionally, when the processor 1110 executes the computer instruction, the station device 1100 is enabled to specifically perform the following steps determining a value of the restriction parameter based on the first information, and determining, based on the value of the restriction parameter and a value of the link overheads, whether to perform network access through the proxy coordination device based on RF communication.

Optionally, the ETX is negatively correlated with the proxy communication rate.

Optionally, the LQL is negatively correlated with the proxy channel quality.

Optionally, the level is positively correlated with the hop count.

Optionally, the link overheads are calculated by the proxy coordination device based on at least one of a proxy communication rate, proxy channel quality, and a level.

It should be understood that the station device 1000 shown in FIG. 10 or the station device 1100 shown in FIG. 11 may be configured to perform operations or procedures of the foregoing method embodiments, and operations and/or functions of the modules or components in the station device 1000 or the station device 1100 are respectively intended for implementing corresponding procedures in the foregoing method embodiments. For brevity, details are not described herein again.

Figure 12:
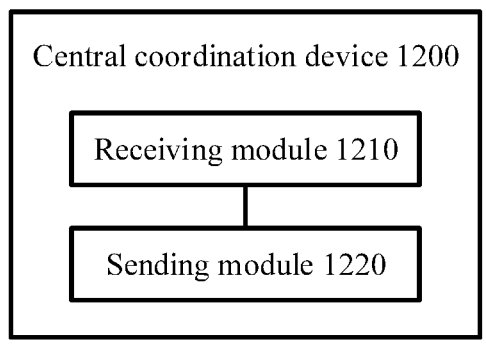
FIG. 12 is a schematic block diagram of a central coordination device according to an embodiment of this application.

FIG. 12 is a schematic block diagram of a central coordination device 1200 according to an embodiment of this application. The central coordination device 1200 includes a receiving module 1210 and a sending module 1220. The receiving module 1210 is configured to receive a function notification packet sent by a proxy coordination device. The function notification packet is used to indicate that the proxy coordination device has a PLC-RF dual-mode function. The sending module 1220 is configured to send a function acknowledgement packet to the proxy coordination device. The function acknowledgement packet is used to instruct the proxy coordination device to enable an RF function.

In this embodiment of this application, the central coordination device performs interaction with the proxy coordination device through the function notification packet and the function acknowledgement packet such that the proxy coordination device enables the RF function, to implement hybrid networking in which a PLC network is used as a backbone and an RF network is used as an end.

Optionally, the sending module 1220 may be further configured to send second information to the proxy coordination device. The second information is used to indicate a first link quality parameter type for determining a restriction parameter, and the first link quality parameter type includes any one or more of the following a proxy communication rate, proxy channel quality, and a level. Alternatively, the sending module 1220 may be further configured to send second information to the proxy coordination device. The second information is used to indicate a first wireless quality parameter type used as a restriction parameter, and the first wireless quality parameter type includes any one or more of the following an ETX, an LQL, and a hop count.

Optionally, the sending module 1220 may be further configured to send third information to the proxy coordination device. The third information is used to indicate a second link quality parameter type for determining link overheads, and the second link quality parameter type includes any one or more of the following a proxy communication rate, proxy channel quality, and a level. Alternatively, the sending module 1220 may be further configured to send third information to the proxy coordination device. The third information is used to indicate a second wireless quality parameter type for determining link overheads, and the second wireless quality parameter type includes any one or more of the following an ETX, an LQL, and a hop count.

Figure 13:
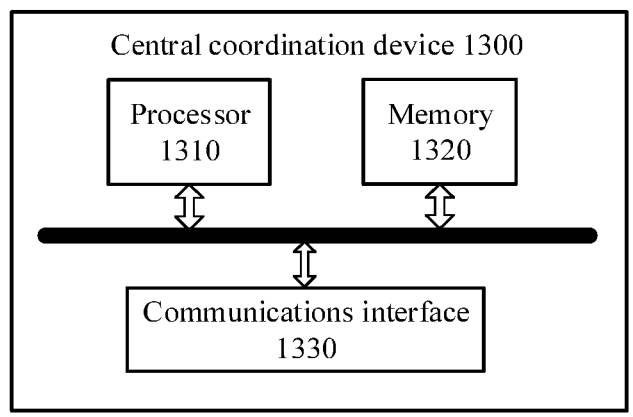
FIG. 13 is a schematic structural diagram of a central coordination device 1100 according to an embodiment of this application.

FIG. 13 is a schematic structural diagram of a central coordination device 1300 according to an embodiment of this application. The central coordination device 1300 shown in FIG. 13 may include a processor 1310, a memory 1320, and a communications interface 1330.

The communications interface 1330 is configured to communicate with another device in a hybrid network. The communications interface 1330 includes a wired communications interface. The wired communications interface includes a PLC interface, and may further include an Ethernet interface. The Ethernet interface may be an optical interface, an electrical interface, or a combination thereof. The communications interface 1330 may further include a wireless communications interface. The wireless communications interface includes an RF interface, a wireless local area network (WLAN) interface, a cellular network communications interface, or a combination thereof.

The memory 1320 stores a computer instruction. When the processor 1310 executes the computer instruction, the central coordination device 1300 is enabled to perform the following step receiving a function notification packet sent by a proxy coordination device, where the function notification packet is used to indicate that the proxy coordination device has a PLC-RF dual-mode function, and sending a function acknowledgement packet to the proxy coordination device, where the function acknowledgement packet is used to instruct the proxy coordination device to enable an RF function.

Optionally, when the processor 1310 executes the computer instruction, the central coordination device 1300 is enabled to further perform the following step sending second information to the proxy coordination device. The second information is used to indicate a first link quality parameter type for determining a restriction parameter, and the first link quality parameter type includes any one or more of the following a proxy communication rate, proxy channel quality, and a level. Alternatively, when the processor 1310 executes the computer instruction, the central coordination device 1300 is enabled to further perform the following step sending second information to the proxy coordination device. The second information is used to indicate a first wireless quality parameter type used as a restriction parameter, and the first wireless quality parameter type includes any one or more of the following an ETX, an LQL, and a hop count.

Optionally, when the processor 1310 executes the computer instruction, the central coordination device 1300 is enabled to further perform the following step sending third information to the proxy coordination device. The third information is used to indicate a second link quality parameter type for determining link overheads, and the second link quality parameter type includes any one or more of the following a proxy communication rate, proxy channel quality, and a level. Alternatively, when the processor 1310 executes the computer instruction, the central coordination device 1300 is enabled to further perform the following step sending third information to the proxy coordination device. The third information is used to indicate a second wireless quality parameter type for determining link overheads, and the second wireless quality parameter type includes any one or more of the following an ETX, an LQL, and a hop count.

It should be understood that the central coordination device 1200 shown in FIG. 12 or the central coordination device 1300 shown in FIG. 13 may be configured to perform operations or procedures in the foregoing method embodiments, and operations and/or functions of the modules or components in the central coordination device 1200 or the central coordination device 1300 are respectively intended for implementing corresponding procedures in the foregoing method embodiments. For brevity, details are not described herein again.

It should be understood that the processor in the embodiments of this application may be a central processing unit (CPU), a network processor (NP), or a combination of a CPU and an NP. The processor may alternatively be a hardware chip. The hardware chip may be an application-specific integrated circuit (ASIC), a programmable logic device (PLD), or a combination thereof. The PLD may be a complex programmable logic device (CPLD), a field-programmable gate array (FPGA), generic array logic (GAL), or a combination thereof.

It may be further understood that the memory mentioned in the embodiments of this application may be a volatile memory or a non-volatile memory, or may include both a volatile memory and a non-volatile memory. The non-volatile memory may be a read-only memory (ROM), a programmable read-only memory (PROM), an erasable programmable read-only memory (EPROM), an electrically erasable programmable read-only memory (EEPROM), a flash memory, a hard disk drive (HDD), or a solid-state drive (SSD). The volatile memory may be a random-access memory (RAM), used as an external cache. Through example but not limitative description, many forms of RAMs may be used, for example, a static random access memory (SRAM), a dynamic random access memory (DRAM), a synchronous dynamic random access memory (SDRAM), a double data rate synchronous dynamic random access memory (DDR SDRAM), an enhanced synchronous dynamic random access memory (ESDRAM), a synchlink dynamic random access memory (SLDRAM), and a direct rambus random access memory (DR RAM).

It should be noted that, when the processor is a general-purpose processor, a digital signal processor (DSP), an ASIC, an FPGA or another programmable logic device, a discrete gate, a transistor logic device, or a discrete hardware component, the memory (storage module) is integrated into the processor.

It should be noted that the memory described in this specification includes but is not limited to these memories and any memory of another proper type.

An embodiment of this application further provides a computer-readable storage medium. The computer-readable storage medium stores an instruction. When the instruction is run on a computer, the computer is enabled to perform the steps performed by the proxy coordination device in the network access method for hybrid networking in the foregoing method embodiments.

An embodiment of this application further provides a computer program product including an instruction. When the instruction in the computer program product is run on a computer, the computer performs the steps performed by the proxy coordination device in the network access method for hybrid networking in the foregoing method embodiments.

An embodiment of this application further provides a computer chip. The computer chip enables a computer to perform the steps performed by the proxy coordination device in the network access method for hybrid networking in the foregoing method embodiments.

An embodiment of this application further provides a computer-readable storage medium. The computer-readable storage medium stores an instruction. When the instruction is run on a computer, the computer is enabled to perform the steps performed by the station device in the network access method for hybrid networking in the foregoing method embodiments.

An embodiment of this application further provides a computer program product including an instruction. When the instruction in the computer program product is run on a computer, the computer performs the steps performed by the station device in the network access method for hybrid networking in the foregoing method embodiments.

An embodiment of this application further provides a computer chip. The computer chip enables a computer to perform the steps performed by the station device in the network access method for hybrid networking in the foregoing method embodiments.

An embodiment of this application further provides a computer-readable storage medium. The computer-readable storage medium stores an instruction. When the instruction is run on a computer, the computer is enabled to perform the steps performed by the central coordination device in the network access method for hybrid networking in the foregoing method embodiments.

An embodiment of this application further provides a computer program product including an instruction. When the instruction in the computer program product is run on a computer, the computer performs the steps performed by the central coordination device in the network access method for hybrid networking in the foregoing method embodiments.

An embodiment of this application further provides a computer chip. The computer chip enables a computer to perform the steps performed by the central coordination device in the network access method for hybrid networking in the foregoing method embodiments.

All or some of the devices provided in the embodiments of this application may be implemented using software, hardware, firmware, or any combination thereof. When software is used to implement the embodiments, the embodiments may be implemented completely or partially in a form of a computer program product. The computer program product includes one or more computer instructions. When the computer instructions are loaded and executed on the computer, all or some of the procedures or functions according to the embodiments of this application are generated. The computer may be a general-purpose computer, a dedicated computer, a computer network, or other programmable apparatuses. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a high-density digital video disc (DVD)), a semiconductor medium (for example, an SSD), or the like.

It should be understood that "first", "second", and various serial numbers in this specification are merely for purpose of distinction for ease of description, but are not intended to limit the scope of this application.

The term "and/or" in this specification describes only an association relationship for describing associated objects and represents that three relationships may exist. For example, A and/or B may represent the following three cases: only A exists, both A and B exist, and only B exists. In addition, the character "/" in this specification generally indicates an "or" relationship between the associated objects.

It should be understood that sequence numbers of the foregoing processes do not mean execution sequences in the embodiments of this application. The execution sequences of the processes should be determined according to functions and internal logic of the processes, and should not be construed as any limitation on the implementation processes of the embodiments of this application. A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the foregoing method embodiments, and details are not described herein again.

The system, apparatus, and method disclosed in the embodiments of this application may be implemented in other manners. For example, the described apparatus is merely exemplary. For example, the unit division is merely logical function division and may be other division in an embodiment. For example, a plurality of units or components may be combined or integrated into another system, or some features may be ignored or not performed. In addition, the displayed or discussed mutual couplings or direct couplings or communication connections may be implemented using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, functional units in the embodiments of this application may be integrated into one processing unit, or each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions of this application essentially, or the part contributing to other approaches, or some of the technical solutions may be implemented in a form of a software product. The software product is stored in a storage medium, and includes several instructions for instructing a computer device (which may be a personal computer, a server, or a network device) to perform all or some of the steps of the methods described in the embodiments of this application. The foregoing storage medium includes any medium that can store program code, such as a Universal Serial Bus (USB) flash drive, a removable hard disk, a ROM, a RANI, a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A network access method for hybrid networking, implemented by a proxy coordination device, wherein the network access method comprises:
    calculating a value of a wireless quality parameter of the proxy coordination device based on a value of a link quality parameter of the proxy coordination device in a power line communication (PLC) network, wherein the link quality parameter comprises at least one of a proxy communication rate of the proxy coordination device, a proxy channel quality of the proxy coordination device, or a level of the proxy coordination device, wherein the wireless quality parameter comprises at least one of an expected transmission count (ETX) of the proxy coordination device, a link quality level (LQL) of the proxy coordination device, or a hop count of the proxy coordination device, wherein the ETX is correlated with a proxy communication rate in the PLC network, wherein the LQL is correlated with a proxy channel quality in the PLC network, and wherein the level is correlated with a hop count in the PLC network;
    calculating link overheads of the proxy coordination device based on the value of the wireless quality parameter, wherein the link overheads indicate overheads for performing network access by a station device via the proxy coordination device based on radio frequency (RF) communication; and
    sending a destination oriented directed acyclic graph (DODAG) information object (DIO) packet comprising the link overheads.

2. The network access method of claim 1, further comprising:
    determining whether a value of a restriction parameter of the proxy coordination device satisfies a threshold requirement, wherein the restriction parameter comprises at least one of, the ETX, the LQL, or the hop count; and
    sending the DIO packet after determining the value of the restriction parameter satisfies the threshold requirement.

3. The network access method of claim 2, wherein the DIO packet further comprises first information indicating the restriction parameter.

4. The network access method of claim 1, wherein the ETX is negatively correlated with a proxy communication rate in the PLC network, wherein the LQL is negatively correlated with proxy channel quality in the PLC network, and wherein the level is positively correlated with the hop count in the PLC network.

5. The network access method of claim 1, further comprising:
    sending a function notification packet to a central coordination device, wherein the function notification packet indicates the proxy coordination device has a PLC-RF dual-mode function; and
    receiving a function acknowledgement packet from the central coordination device, wherein the function acknowledgement packet instructs the proxy coordination device to enable an RF function.

6. The network access method of claim 1, further comprising receiving second information from a central coordination device, wherein the second information indicates a first link quality parameter type for determining a restriction parameter.

7. The network access method of claim 1, further comprising receiving third information from a central coordination device, wherein the third information indicates a second link quality parameter type for determining the link overheads.

8. A network access method for hybrid networking, implemented by a station device, wherein the network access method comprises:
    receiving a destination oriented directed acyclic graph (DODAG) information object (DIO) packet from a proxy coordination device, wherein the DIO packet comprises link overheads of the proxy coordination device, wherein the link overheads are based on a link quality parameter of the proxy coordination device in a power line communication (PLC) network that comprises at least one of an expected transmission count (ETX), a link quality level (LQL), or a hop count, wherein the link overheads indicate overheads for performing network access by the station device through the proxy coordination device based on radio frequency (RF) communication, wherein the link quality parameter comprises at least one of a communication rate of the proxy coordination device, a channel quality of the proxy coordination device, or a level of the proxy coordination device, and wherein the communication rate is correlated with an expected transmission count (ETX) in the PLC network, the channel quality is correlated with the LQL in the PLC network, and the level is correlated with the hop count in the PLC network; and determining, based on the link overheads of the proxy coordination device, whether to perform network access through the proxy coordination device based on RF communication.

9. The network access method of claim 8, wherein the link overheads are based on a value of a wireless quality parameter of the proxy coordination device, and wherein the value of the wireless quality parameter of the proxy coordination device is based on a value of the link quality parameter of the proxy coordination device.

10. The network access method of claim 8, wherein the DIO packet further comprises first information indicating a restriction parameter, wherein the restriction parameter comprises at least one of the ETX, the LQL, or the hop count, and wherein the network access method further comprises:
    determining a value of the restriction parameter of the station device based on the first information; and
    determining whether to perform network access through the proxy coordination device based on RF communication based on the value and a second value of the link overheads of the proxy coordination device.

11. A proxy coordination device, comprising:
    a calculator configured to:
        calculate a value of a wireless quality parameter of the proxy coordination device based on a value of a link quality parameter of the proxy coordination device in a power line communication (PLC) network; and
        calculate link overheads of the proxy coordination device based on the value of the wireless quality parameter, wherein the link overheads indicate overheads for performing network access by a station device through the proxy coordination device based on radio frequency (RF) communication, wherein the link quality parameter of the proxy coordination device comprises at least one of a proxy communication rate of the proxy coordination device, proxy channel quality of the proxy coordination device, or a level of the proxy coordination device, and wherein the wireless quality parameter of the proxy coordination device comprises at least one of an expected transmission count (ETX) of the proxy coordination device, a link quality level (LQL) of the proxy coordination device, or a hop count of the proxy coordination device, wherein the ETX is correlated with a proxy communication rate in the PLC network, wherein the LQL is correlated with a proxy channel quality in the PLC network, and wherein the level is correlated with a hop count in the PLC network; and
    an RF circuit coupled to the calculator and configured to send a destination oriented directed acyclic graph (DODAG) information object (DIO) packet comprising the link overheads of the proxy coordination device.

12. The proxy coordination device of claim 11, wherein the RF circuit is further configured to:
    determine whether a value of a restriction parameter of the proxy coordination device satisfies a threshold requirement, wherein the restriction parameter comprises at least one of the ETX, the LQL, and the hop count; and
    send the DIO packet after determining the value of the restriction parameter satisfies the threshold requirement.

13. The proxy coordination device of claim 12, wherein the DIO packet further comprises first information that indicates the restriction parameter.

14. The proxy coordination device of claim 11, wherein the proxy coordination device further comprises a PLC circuit coupled to the calculator and configured to communicate with a central coordination device.

15. The proxy coordination device of claim 14, wherein the PLC circuit is further configured to receive second information from the central coordination device that indicates a first link quality parameter type for determining a restriction parameter.

16. The proxy coordination device of claim 14, wherein the PLC circuit is further configured to:
    send a function notification packet to the central coordination device that indicates the proxy coordination device has a PLC-RF dual-mode function; and
    receive a function acknowledgement packet from the central coordination device that instructs the proxy coordination device to enable an RF function.

17. The proxy coordination device of claim 14, wherein the PLC circuit is further configured to receive third information from the central coordination device that indicates a second link quality parameter type for determining the link overheads.

18. A station device, comprising:
    a radio frequency (RF) circuit configured to
        receive a destination oriented directed acyclic graph (DODAG) information object (DIO) packet from a proxy coordination device, wherein the DIO packet comprises link overheads of the proxy coordination device, wherein the link overheads of the proxy coordination device are based on a link quality parameter of the proxy coordination device in a power line communication (PLC) network that comprises at least one of an expected transmission count (ETX), a link quality level (LQL), or a hop count, wherein the link overheads of the proxy coordination device indicate overheads for performing network access by the station device through the proxy coordination device based on RF communication, wherein the link quality parameter comprises at least one of a communication rate of the proxy coordination device, a channel quality of the proxy coordination device, or a level of the proxy coordination device, and wherein the communication rate is correlated with an expected transmission count (ETX) in the PLC network, the channel quality is correlated with the LQL in the PLC network, and the level is correlated with the hop count in the PLC network; and
    a determiner coupled to the RF circuit and configured to determine, based on the link overheads of the proxy coordination device, whether to perform network access through the proxy coordination device based on RF communication.

19. The station device of claim 18, wherein the link overheads are based on a value of a wireless quality parameter of the proxy coordination device, and wherein the value of the wireless quality parameter of the proxy coordination device is based on a value of the link quality parameter of the proxy coordination device.

20. The station device of claim 18, wherein the DIO packet further comprises first information indicating a restriction parameter, wherein the restriction parameter comprises at least one of an expected transmission count (ETX), a link quality level (LQL), or a hop count, wherein the determiner is further configured to:
    determine a value of the restriction parameter of the station device based on the first information; and determine, based on the value of the restriction parameter of the station device and a value of the link overheads of the proxy coordination device, whether to perform network access through the proxy coordination device based on RF communication.

\* \* \* \* \*